(12) United States Patent
Reynolds et al.

(10) Patent No.: US 10,518,686 B2
(45) Date of Patent: Dec. 31, 2019

(54) TRUCK BODY

(71) Applicant: Austin Engineering USA Services, Inc., Casper, WY (US)

(72) Inventors: Frederick J. Reynolds, Casper, WY (US); Ronald L. Hehn, Hawley, MN (US)

(73) Assignee: AUTIN ENGINEERING USA SERVICES, INC., Mills, WY (US)

( * ) Notice: Subject to any disclaimer, the term of this patent is extended or adjusted under 35 U.S.C. 154(b) by 0 days.

(21) Appl. No.: 15/173,470

(22) Filed: Jun. 3, 2016

(65) Prior Publication Data

US 2016/0280113 A1 Sep. 29, 2016

Related U.S. Application Data

(62) Division of application No. 13/390,751, filed as application No. PCT/US2010/059394 on Dec. 8, 2010, now Pat. No. 9,365,148.

(60) Provisional application No. 61/288,150, filed on Dec. 18, 2009.

(51) Int. Cl.
| B60P 1/04 | (2006.01) |
| B60P 1/28 | (2006.01) |
| B60P 1/16 | (2006.01) |

(52) U.S. Cl.
CPC ............... *B60P 1/286* (2013.01); *B60P 1/04* (2013.01); *B60P 1/16* (2013.01); *B60P 1/28* (2013.01); *B60P 1/283* (2013.01)

(58) Field of Classification Search
CPC .. B60P 1/286; B60P 1/28; B60P 1/283; B60P 1/04; B60P 1/16; B62D 33/077
USPC ............... 298/1 B, 7, 17 R, 22 R; 296/183.1, 296/183.2, 184.1
See application file for complete search history.

(56) References Cited

U.S. PATENT DOCUMENTS

| 1,773,496 | A | * | 8/1930 | Osman | ...................... | B60P 1/24 |
| | | | | | | 298/17 R |
| 7,901,009 | B2 | * | 3/2011 | Hagenbuch | ............. | B60P 1/286 |
| | | | | | | 298/22 R |
| 9,365,148 | B2 | * | 6/2016 | Reynolds | ................ | B60P 1/286 |
| | | | | | | 298/22 R |

* cited by examiner

*Primary Examiner* — Stephen T Gordon
(74) *Attorney, Agent, or Firm* — ColterJennings

(57) ABSTRACT

A truck body includes a front wall, side walls, and a floor. The floor has panels disposed at predetermined angles from the horizontal that, with the other parts of the body, form a payload volume within the body. The floor also includes a tail panel disposed at a lesser angle from the horizontal to facilitate the shedding of the payload when dumping, and further to maintain the center of mass of the payload in a generally forward position during dumping.

8 Claims, 20 Drawing Sheets

12/22 Floor
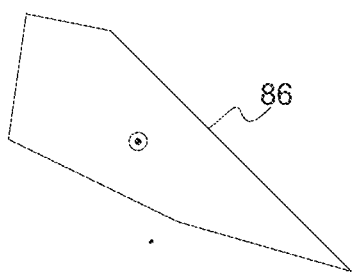
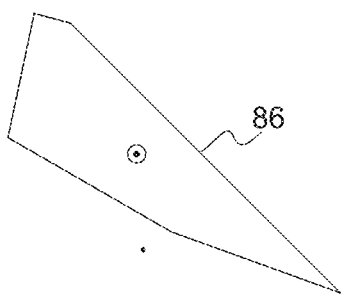
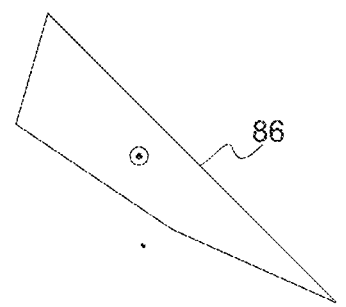
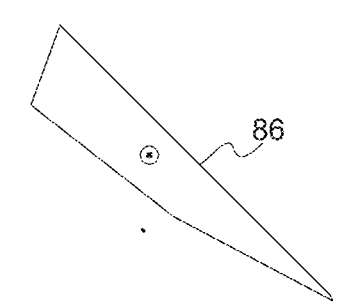
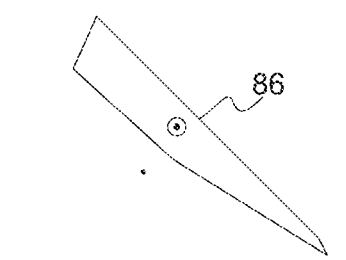
12/22/8 Floor
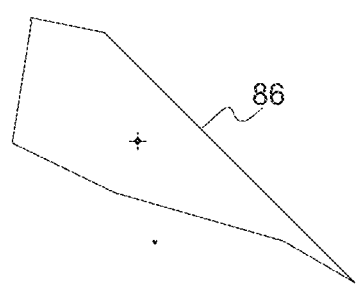
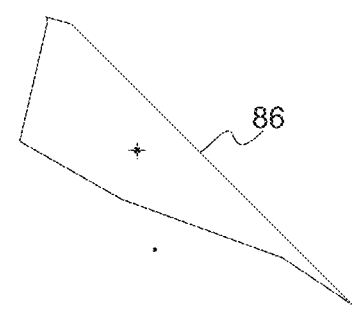
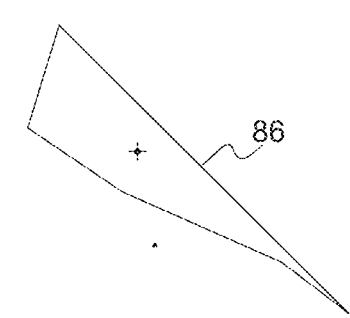
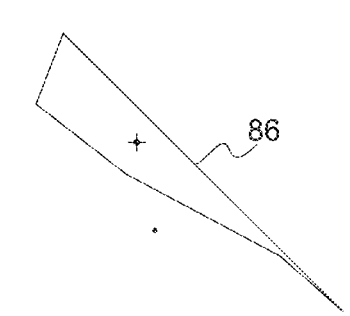
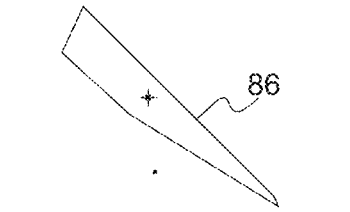
38 deg
42 deg
46 deg
50 deg
54 deg
Fig. 16

240 Ton Truck Comparison

| | A | B | C | D | E | F | G | H | I | J | K | L |
|---|---|---|---|---|---|---|---|---|---|---|---|---|
| | Material Discharge | Floor Style | Payload Material | Body Rotation (degrees) | Payload in Body (yd3) | Payload in Body (Lbs) | Front Axle Load (Lbs) | Rear Axle Load (Lbs) | Front Axle Load (%) | Rear Axle Load (%) | Payload Retained (%) | Total Load Lift Cylinder (Lbs) |
| 1 | | | | | | | | | | | | |
| 2 | Constant 45 deg | 12/10 deg | Dirt | 0.0 | 193.2 | 510,022 | 281,829 | 564,192 | 33.3% | 66.7% | 100.0% | -485,498 |
| 3 | Constant 45 deg | 12/10 deg | Dirt | 36.0 | 193.2 | 510,022 | 127,562 | 718,460 | 15.1% | 84.9% | 100.0% | -116,921 |
| 4 | Constant 45 deg | 12/10 deg | Dirt | 38.0 | 192.9 | 509,230 | 114,261 | 730,968 | 13.5% | 86.5% | 99.8% | -85,825 |
| 5 | Constant 45 deg | 12/10 deg | Dirt | 40.0 | 190.7 | 503,342 | 100,707 | 738,635 | 12.0% | 88.0% | 98.7% | -52,306 |
| 6 | Constant 45 deg | 12/10 deg | Dirt | 42.0 | 179.3 | 473,246 | 100,316 | 708,930 | 12.4% | 87.6% | 92.8% | -44,510 |
| 7 | Constant 45 deg | 12/10 deg | Dirt | 44.0 | 165.2 | 436,022 | 100,286 | 671,736 | 13.0% | 87.0% | 85.5% | -35,684 |
| 8 | Constant 45 deg | 12/10 deg | Dirt | 46.0 | 148.4 | 391,829 | 99,807 | 628,022 | 13.7% | 86.3% | 76.8% | -23,775 |
| 9 | Constant 45 deg | 12/10 deg | Dirt | 48.0 | 130.6 | 344,863 | 99,257 | 581,606 | 14.6% | 85.4% | 67.6% | -10,683 |
| 10 | Constant 45 deg | 12/10 deg | Dirt | 50.0 | 114.5 | 302,386 | 91,545 | 546,841 | 14.3% | 85.7% | 59.3% | 20,127 |
| 11 | Constant 45 deg | 12/10 deg | Dirt | 52.0 | 95.7 | 252,569 | 84,369 | 504,200 | 14.3% | 85.7% | 49.5% | 52,354 |
| 12 | Constant 45 deg | 12/10 deg | Dirt | 54.0 | 75.7 | 199,874 | 78,703 | 457,171 | 14.7% | 85.3% | 39.2% | 82,319 |
| 13 | | | | | | | | | | | | |
| 14 | Constant 45 deg | 12/22/8 deg | Dirt | 0.0 | 193.2 | 509,916 | 282,067 | 563,849 | 33.3% | 66.7% | 100.0% | -486,039 |
| 15 | Constant 45 deg | 12/22/8 deg | Dirt | 36.0 | 191.8 | 506,326 | 123,882 | 718,443 | 14.7% | 85.3% | 99.3% | -107,263 |
| 16 | Constant 45 deg | 12/22/8 deg | Dirt | 38.0 | 182.5 | 481,826 | 123,339 | 694,488 | 15.1% | 84.9% | 94.5% | -101,072 |
| 17 | Constant 45 deg | 12/22/8 deg | Dirt | 40.0 | 171.2 | 452,047 | 123,529 | 664,518 | 15.7% | 84.3% | 88.6% | -95,321 |
| 18 | Constant 45 deg | 12/22/8 deg | Dirt | 42.0 | 157.2 | 414,876 | 124,212 | 626,664 | 16.5% | 83.5% | 81.3% | -88,897 |
| 19 | Constant 45 deg | 12/22/8 deg | Dirt | 44.0 | 141.0 | 372,187 | 124,449 | 583,738 | 17.6% | 82.4% | 73.0% | -79,896 |
| 20 | Constant 45 deg | 12/22/8 deg | Dirt | 46.0 | 122.7 | 323,981 | 124,106 | 535,875 | 18.8% | 81.2% | 63.5% | -67,868 |
| 21 | Constant 45 deg | 12/22/8 deg | Dirt | 48.0 | 104.3 | 275,326 | 124,089 | 487,236 | 20.3% | 79.7% | 54.0% | -56,285 |
| 22 | Constant 45 deg | 12/22/8 deg | Dirt | 50.0 | 86.4 | 228,175 | 124,780 | 439,396 | 22.1% | 77.9% | 44.7% | -46,637 |
| 23 | Constant 45 deg | 12/22/8 deg | Dirt | 52.0 | 70.7 | 186,569 | 120,655 | 401,914 | 23.1% | 76.9% | 36.6% | -25,553 |
| 24 | Constant 45 deg | 12/22/8 deg | Dirt | 54.0 | 55.1 | 145,385 | 117,207 | 364,178 | 24.3% | 75.7% | 28.5% | -5,764 |

Fig. 17

TRUCK BODY

CROSS-REFERENCE TO RELATED APPLICATIONS

This application a divisional of U.S. patent application Ser. No. 13/390,751 filed Feb. 16, 2012 titled "Truck Body," now U.S. Pat. No. 9,365,148, which was a National Stage Entry of International Application No. PCT/US10/59394 filed Dec. 8, 2010 titled "Truck Body," which in turn claims priority based on U.S. Provisional Patent Application Ser. No. 61/288,150 filed Dec. 18, 2009 and titled "Flow Control Haul Body," the entire disclosures of all of which are incorporated herein by this reference.

BACKGROUND

This invention relates to an improved body for a dump truck, and in particular to a gate-free truck body for use in large-scale mining operations and a style of body that may be adapted for use on numerous types of mining truck chassis, after accounting for weight distribution, wheel base, gross vehicle weight, and other such factors.

Referring to FIGS. 1A and 1B, a typical large mining truck 10 has a chassis 12 capable of mounting a variety of bodies 14 having different shapes and designs. For various reasons, including the fact that different materials to be hauled have different densities, truck bodies may have different shapes, may be made of different materials, and may have different front wall 16, side walls 18a and 18b, floor 20, and canopy 22 designs. For example, some bodies are designed to haul low density materials, such as coal. Other bodies are designed to haul higher density materials including rock or overburden (the rock and dirt found above an ore or coal seam).

In general, the density of coal is about half that of overburden. Thus, a given volume of coal weighs approximately half what the same volume of overburden weighs, and so the volume of a truck body 14 designed to haul coal may be twice as large as a body designed to haul overburden without exceeding the carrying capacity of the truck chassis 12. However, having one set of trucks with bodies for coal and a second set of trucks with bodies for overburden can significantly increase mining costs because of the need to maintain two fleets of vehicles.

To avoid maintaining two sets of trucks, truck bodies 14 designed to perform the task of hauling both coal and overburden have been designed. These bodies are typically called multi-purpose bodies, or "combo" (short for combination) bodies. As a practical matter, because of the different densities of the hauled material, and because of the maximum load weight for which a body may be designed, the combination bodies may haul very different volumes of the different materials.

That is, when hauling low density coal the body may be loaded to a much higher height than is the case when hauling a high density material such as overburden. This difference is shown in FIGS. 2 and 3, which depict the heap height of a full capacity coal load using dark dashed lines 26, and the heap height of a full capacity overburden load using dark dotted lines 28, in two different styles of body 14. These figures also depict the side wall 18a and 18b heights of a full capacity coal load using light dashed lines 26a and the side wall 18a and 18b heights of a full capacity overburden load using light dotted lines 28a. As is evident in either design, while hauling overburden material the truck body typically provides significant reserve volume. This difference is required because hauling the same volume of overburden as coal will likely exceed the maximum carrying capacity of the truck 10.

In the last several years, significant efforts to analyze the characterization of payloads and prediction of dumping performance for various floor profiles have provided new insights into designs for combination bodies, and in particular adjustments of the angles of the floor of the combination body. For example, as shown in FIG. 2, one contemplated concept was for a "12+10" or 12/22 floor design, that is, a truck body floor having a front portion at a 12 degree angle to the horizontal, and a rear portion with an additional 10 degrees (thus a total of 22 degrees) angle to the horizontal. However, analysis of that concept indicated the design presented risks in shedding performance, that is, how the load dumps out of the body as the body is rotated up for unloading.

Shedding performance can be critical to the performance of a truck body. For overburden placed in a combination body, the payload may occupy approximately half of the body capacity. Thus, when placed in a position for proper axle distribution during road transport, a large portion of the rear of the body is empty. During the dump cycle, however, the material sheds onto the rear section or rear panel of the body, and may form a secondary heap on the rear panel, leading to unacceptable and potentially dangerous conditions especially when dumping over a ridge.

That is, typically, large dump trucks have two front tires 36 on the front axle, and four back tires 38 on the rear axle 39, and so the optimum load-carrying design places approximately ⅔ of the load on the four rear tires and ⅓ of the load on the two front tires. Depending upon the length of the inclined rear panel, the load can form a secondary heap on the back of the body 14 when dumping that then spans between the side walls 18a and 18b. Thus, as the load sheds off the body, the weight distribution (center of mass) of the load may shift aft, resulting in too much of the weight being carried by the back of the truck.

Because the fulcrum of the body being tipped is typically behind the rear tires 38 and axle 39, if at any time during dumping of a load the center of gravity of the load shifts too far to the rear, the front end of truck 10 can be tipped up, meaning that the cab 42 of the truck rises, sometimes several feet. Even if the weight distribution is not so skewed as to cause the cab to rise, if the center of mass of the load shifts too far, the lift cylinders 40 pushing the front of the body 14 up to dump the load may suddenly go from being under compression (pushing the body upward) to being under tension (the body tugging on the lift cylinders), something that can seriously damage the lift cylinders. Thus, improper weight distribution of the load during dumping can suddenly thrust the cab upward, create tension on the lift cylinders, and also cause a sudden dumping of a large portion of the load, which then shifts the center of gravity of the load forward again, thereby causing the elevated cab to drop and forcing the lift cylinders back into compression, further damaging the cylinders and perhaps frightening or even harming the truck driver. Furthermore, moving the pivot point to be in front of the rear tires may cause the body to strike the tires or the ground when dumping, and doing so will also reduce the leverage available to the lift cylinders, increasing the weight those cylinders must lift to dump the load.

As a result, it is important to maintain a proper front to back weight distribution of the load during dumping. Because analysis of the 12/22 body indicated there may be problems with load distribution when dumping from some trucks, a "12+5" or 12/17 dual slope floor combination haul body was designed for those types of trucks with a front portion of the floor angle at 12 degrees from horizontal with an additional 5 degrees incline for the rear portion of the floor resulting in a combined 17 degrees off horizontal. This design provided a relatively large volume or cavity for carrying material without making the body so long as to obstruct dumping as a result of, for example, the end of the body hitting the rear tires or the ground or previously dumped material. However, analysis indicated that, for several reasons the 12/17 body would not work on some chassis.

Because the rear portion of the load or heap is generally conical, for dense material loads there is often several feet between the where the heap strikes the sidewalls 18a and 18b and the rear of the floor 20. In a 12/22 body, the rear floor panel 44 is at an angle 10 degrees greater than the forward floor panel 46 and based on sliding friction will shed payload 10 degrees later than the forward floor. Assuming a 45 degree shed line (that is, assuming the material will shed from the heap when the angle of the surface of the material is at 45 degrees) and an initial heap sloped at 2:1 (that is, the heap will have an initial slope of about 26.5 degrees from the horizontal), individual layers of the heap will begin sliding at the point where the truck body 14 has rotated approximately 18.5 degrees, because (18.5 rotation)+(26.5 heap slope)=45 degrees. At this angle of body rotation, the rear floor panel, which was originally 12+10=22 degrees from the horizontal, will be at an angle of −3.5 degrees from horizontal (22 degrees minus the 18.5 degrees of rotation).

If the static coefficient of friction between the material and the floor is 0.61, the body 14 must rotate an additional 35 degrees for all of the material to shed freely off the rear of the floor 20. The forward floor panel 46 will begin to apply a thrust loading to the accumulating material on the rear panel 44 until the frictional resisting force is overcome, at which time the entire heap will slide as a unit. FIGS. 4 and 5 depict the difference in the thrust loading or the payload reaction as the body is dumping, including the load stress presented by the load on two different floors. FIG. 4 shows a 12/22 floor and FIG. 5 shows a 12/17 floor. As indicated in those figures, at 35 degrees of rotation, the 12/22 floor presents significantly more stress along the floor panels than the 12/17 floor, indicating a higher level of pressure. However, both these floors show the potential for secondary heaps to form on the rear panels of the bodies, as indicated by the darker sections on the rear panels shown in FIGS. 4 and 5.

A variety of combination bodies have been developed using similar floor designs. To date, many gate-free haul bodies designed to be mounted on chassis made by certain manufacturers are of the dual slope design and generally begin with a floor at an angle ranging from an initial slope of between 7 and 12 degrees from horizontal and then the remaining floor increases in angle near the pivot bore. This extra floor "kick" eliminates the need for a tailgate by increasing the length of the body while still maintaining an adequate volume or cavity for the payload.

Canopy loading is often required to attain the desired payload volume for coal while maintaining acceptable axle (tire) weight-bearing distributions. Even with these duel angle floor designs, the center of mass of the load may shift suddenly aft, resulting in tipping of the cab, or tension on the lift cylinders, or both. The success of these other designs is dependent on numerous factors, including the wheel base of the truck, the maximum load rating of the truck, the length of the body, stress on the body floor due to movement of a large mass of the load to the rear of the body without shedding, shedding of load too quickly or too slowly because of the body design, and other factors. Failure to consider any relevant factors may result in a body that does not properly shed the load.

Further reducing the angle of the floor "kick" (that is, less than the 5 degrees of a 12/17 body) typically results in a body that does not have adequate carrying capacity, as the load may slide off under transport, thus resorting back to a body that requires a tail gate, with the consequent construction and maintenance costs and risks of damage to the tail gate and loading buckets when loading the body. Also, if the floor angle is minimized, near the end of the payload dump cycle significantly more material ends up near the back of the floor. That material can suddenly slide and shed, causing the center of mass/gravity of the load to suddenly shift aft, leading to the risks of the cab suddenly rising (and falling when the material precipitously sheds) and sudden tension (and compression when the material sheds) on the lift cylinders. Therefore, further reductions in the angle of the body floor have typically not been successful.

Because combination bodies present significant possible advantages in haul truck fleet management, design of such a combination body can be greatly complicated by the real world requirements of length, center of load mass, and other such factors. However, a combination body design that might be readily adapted to be employed on different manufacturer's chassis would likely present significant advantages. Furthermore, a combination body having a significantly reduced tendency for the center of mass of the load to shift too far to the rear when dumping would likely be highly advantageous. Indeed, many of these advantages would also be quite useful on a high volume body carrying a high density material as well as various other types of bodies.

SUMMARY

This invention discloses a truck body floor design that overcomes many of the problems of prior designs. Although there are many alternatives to the specific designs possible, in general the floor may be thought of as including a plurality of panels at different angles relative to the horizontal. For example, the floor may have a front panel at one angle, an intermediate panel at a different angle, and a tail panel at a third angle. Although there is a certain level of design variance for different bodies in different applications, in at least one embodiment the front panel of the floor has an incline typically between 5 and 26 degrees (from the horizontal), and the intermediate panel has an incline typically between 6 and 30 degrees from the horizontal. The exact angles depend on the constraints imposed by the chassis on which the body is to be used as well as the desired load carrying load capacity of the body.

The tail panel is designed to have less of an incline than the intermediate panel, or than the section of the floor immediately forward of the tail panel. Again, the exact incline depends on the chassis and other factors known in the art, but typically the tail panel will have an incline of between about 0 degrees and about 15 degrees from the horizontal. Although there are exceptions, because the tail panel is typically at least level with the horizontal, the tail panel may support a portion of a low-density load, such as coal, providing the body with a greater load volume capacity. When carrying higher density material such as overburden, the tail panel does not typically carry much of the load, and the front and intermediate panels form a significant load-carrying volume.

Therefore, the volume for carrying a low density coal load is not significantly reduced from prior 12/17 and 12/22 and other similar combination bodies. However, when dumping, the load sheds material at a different rate than with prior bodies. In particular, the body is typically pivotally attached to a truck chassis, so that the forward end of the body may be pivoted upward to dump the load over the spillway created by the tail panel.

As a result of the different load shedding and retention characteristics of the present body, the center of mass of the load stays generally forward in the body, typically forward of the pivot point or points connecting the body to the chassis, and a significant secondary heap near the back of the floor does not form and no resulting rotational load torque is transferred when dumping. Thus, the risk of the cab suddenly elevating or of the lift cylinders going into tension is greatly reduced. Furthermore, initial testing and analysis indicates that the load is actually shed at a faster initial rate, and the load may be shed at a faster total rate, meaning that during dumping there will typically be less stress on the lift cylinders at a given angle of rotation than was the case with prior bodies.

BRIEF DESCRIPTION OF THE DRAWINGS

Other features and advantages of the present invention will be apparent from reference to the following Detailed Description taken in conjunction with the accompanying Drawings, in which:

FIG. 16 is a side schematic view of the 12/22 body and of the 12/22/8 body adapted for use on a truck, at various degrees of rotation, generally correlating with the chart of FIG. 17, with the centers of mass of the loads at the various angles indicated by a "+" symbol; and FIG. 17 is a chart showing comparative calculations of the load shedding characteristics of a 12/22 body and of a 12/22/8 body at various degrees of rotation.

DETAILED DESCRIPTION

Figure 1A:
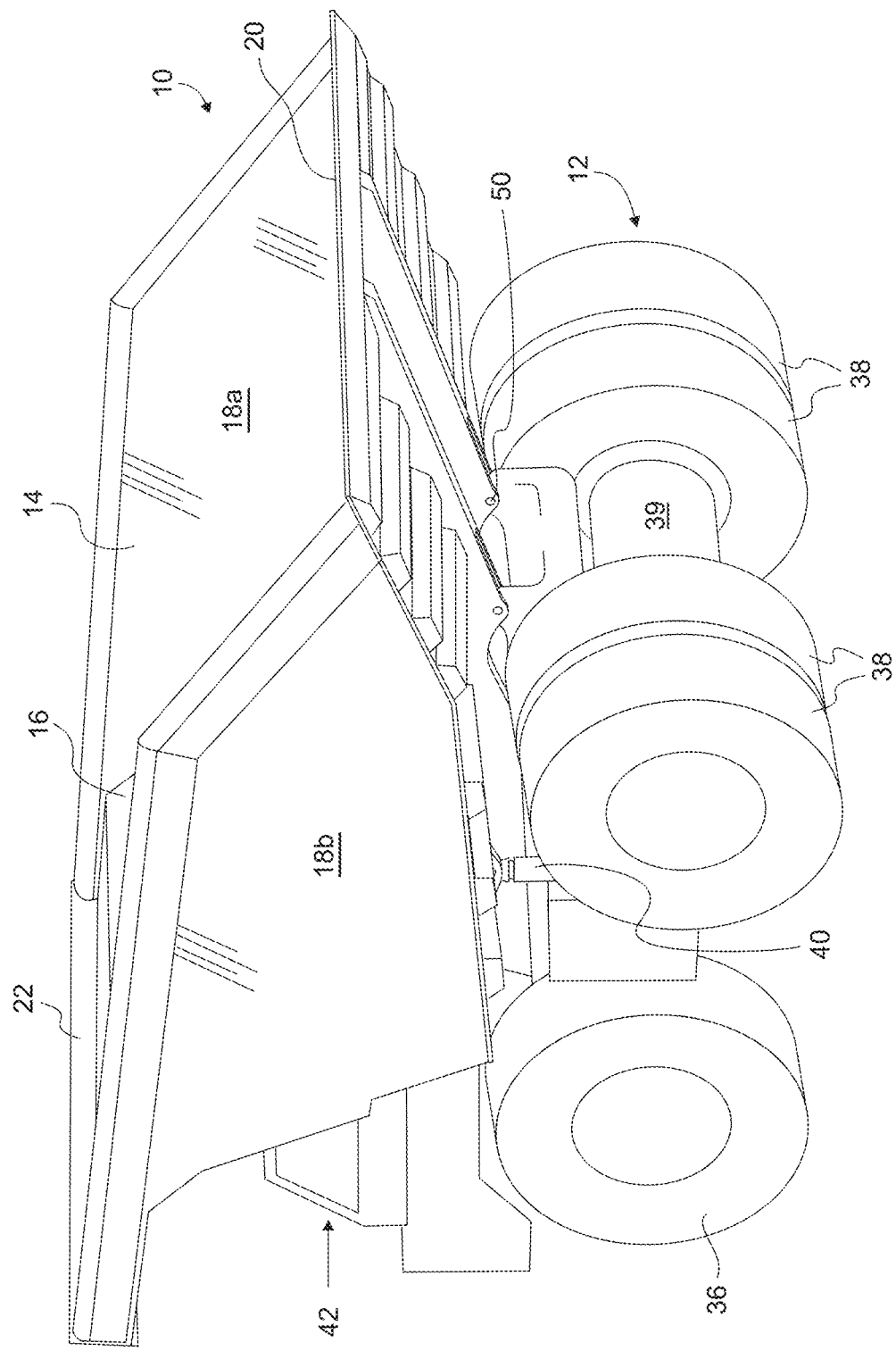
FIG. 1A depicts a lower rear perspective view of a 12/22 truck body mounted on a truck chassis.

As depicted for examples in FIGS. 1A, 1B, 6A and 6B, a large mining or hauling truck 10 typically has an operators cab 42, a chassis 12 and a plurality of tires 36 and 38 mounted on the chassis in a conventional manner. A truck body 14 is mounted on the chassis. The truck body typically includes a front wall 16, two laterally (transversely) opposed side walls 18a and 18b, and a floor 20. Often the body 12 includes a canopy 22 extending horizontally from the top of the front wall and over the cab to protect the cab from falling rock and ore.

The body 14 is pivotally mounted to the chassis 12 by one or more pins 50. In this embodiment, a pair of lift cylinders 40 (one shown in each of FIGS. 1A and 6A) are mounted to the chassis with their extension cylinders affixed to the truck body 14. When extended, the lift cylinders rotate the body upwards about the pins 50 for dumping purposes; that is, the pushing of the lift cylinders results in the body rotating about the pivot pins. As the body pivots around the pins, the payload in the cavity of the body begins to flow out of the body and unto the ground or other receiving area or structure. The pins 50 typically connect the body 14 to the chassis 12 behind the rear tires 38 so that the effective length of the body extending downward is not so great as to cause the body to strike the tires or the ground when dumping the load.

Figure 2:
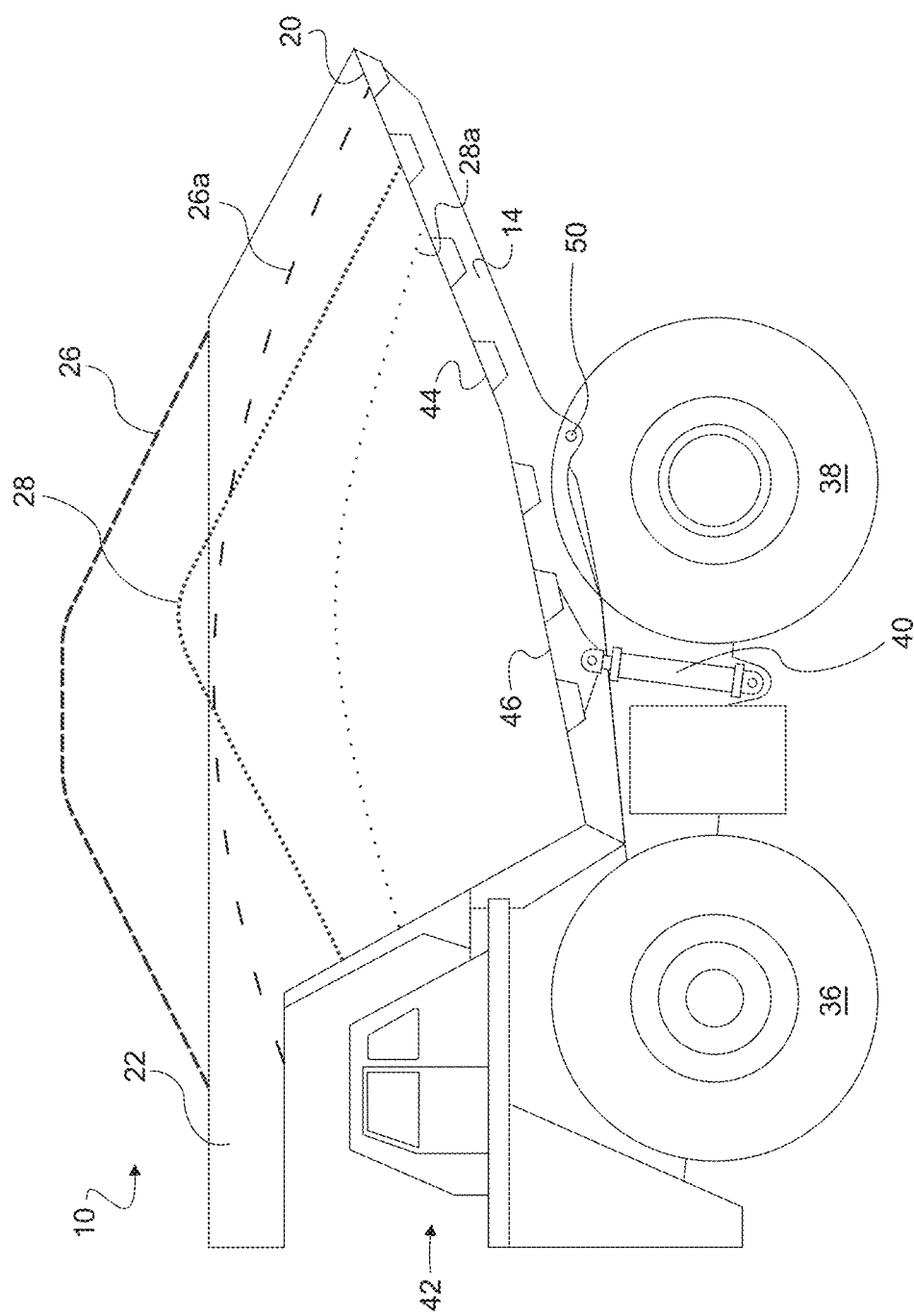
FIG. 2 depicts a side view of the body of FIG. 1A showing loads of low density and high density material in cross section.
Figure 3:
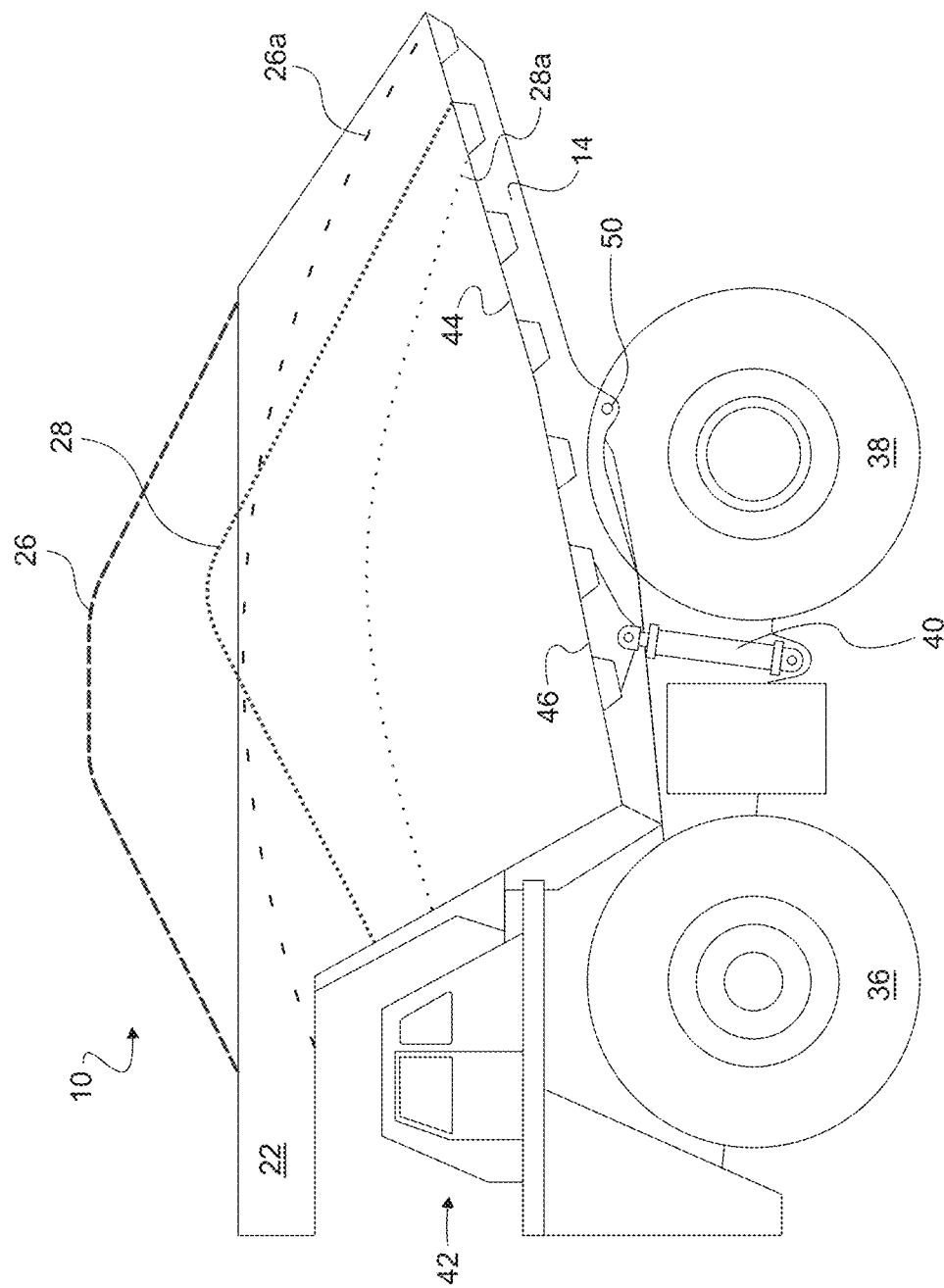
FIG. 3 depicts a side view of a truck body having a 12/17 truck body showing loads of low density and high density material in cross section.
Figure 4:
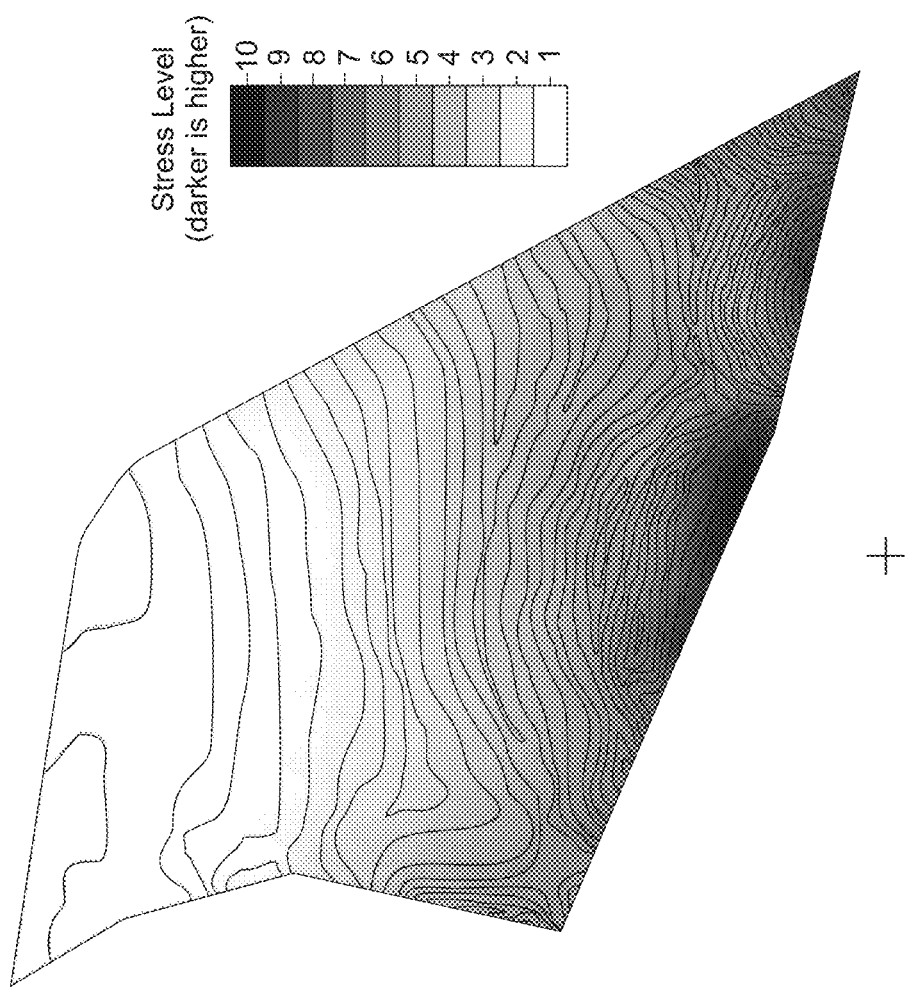
FIG. 4 depicts a cross-sectional view of a stress diagram showing the difference in the thrust loading or the payload reaction as the body is dumping for a 12/22 truck body rotated 35 degrees.
Figure 5:
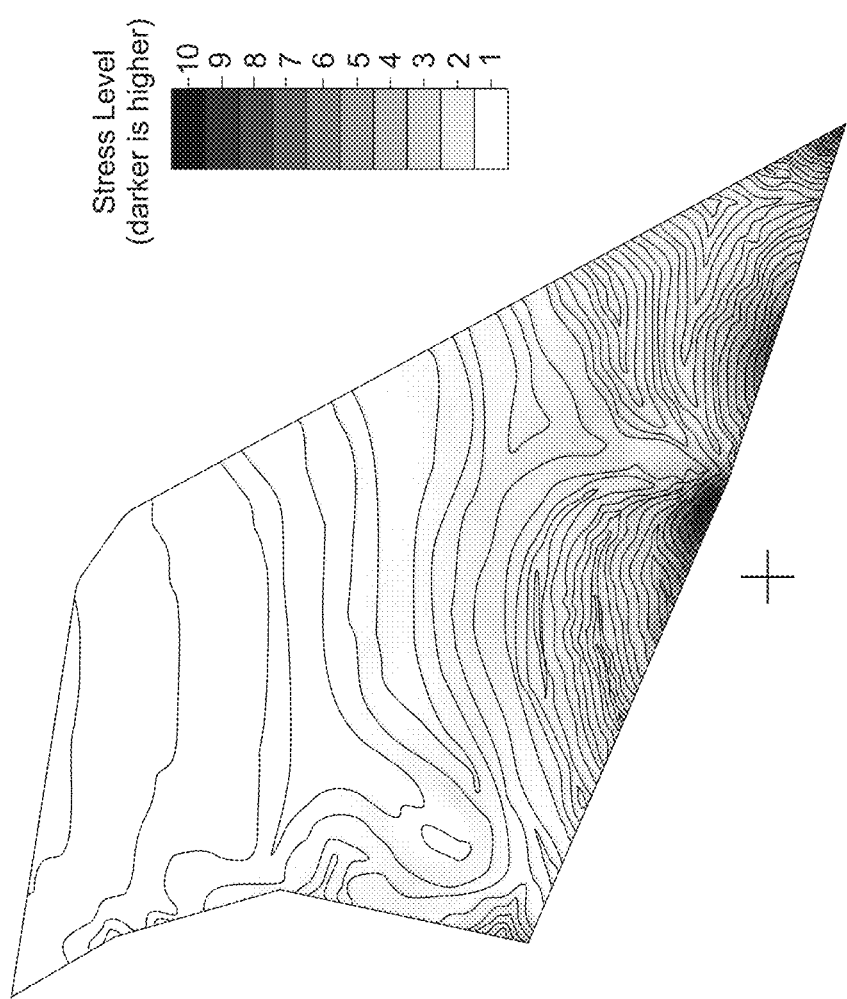
FIG. 5 depicts a cross-sectional view of a stress diagram showing the difference in the thrust loading or the payload reaction as the body is dumping for a 12/17 truck body rotated 35 degrees.

As depicted for example in FIGS. 2 and 3, viewed from one side, the floor 20 of a prior body 14 often had two panels that, when the body was down (that is, in a lowered condition) formed two different angles to the horizontal, a forward panel 46 that angled upwardly at a given angle (often 5 to 26 degrees from the horizontal) and a rearward panel 44 that angled upwardly at an even greater angle from the horizontal (often 6 to 30 degrees). This two-panel floor 20, coupled with the side walls 18a and 18b, and the front wall 16, formed a cargo carrying cavity or load cavity. FIG. 2 depicts a 12/22 floor, and FIG. 3 depicts a 12/17 floor.

As depicted in FIGS. 2 and 3 and as previously described, a load of material in the cavity typically forms a somewhat conical shape. As a result, the payload in this example has a heap angle of between 26 and 28 degrees (often the heap extends longitudinally in the body) that slopes down generally in all directions, striking the sides 18a and 18b and the front wall 16 below the upper edges of those walls. Typical load "cones" are depicted in FIGS. 2 and 3. FIG. 2 depicts a 12/22 body 14 with the top of a coal load in dashed lines 26 and shows the abutment of the coal load with the side walls in dashed lines 26a, and further depicts the top of an overburden load in dotted lines 28 and the abutment of the overburden load in dotted lines 28a. FIG. 3 depicts the same features for a 12/17 body. The sloped load also extends towards the rear of the floor 20, but there being no wall or back gate cannot extend beyond the rearmost edge of the floor or body.

Figure 6A:
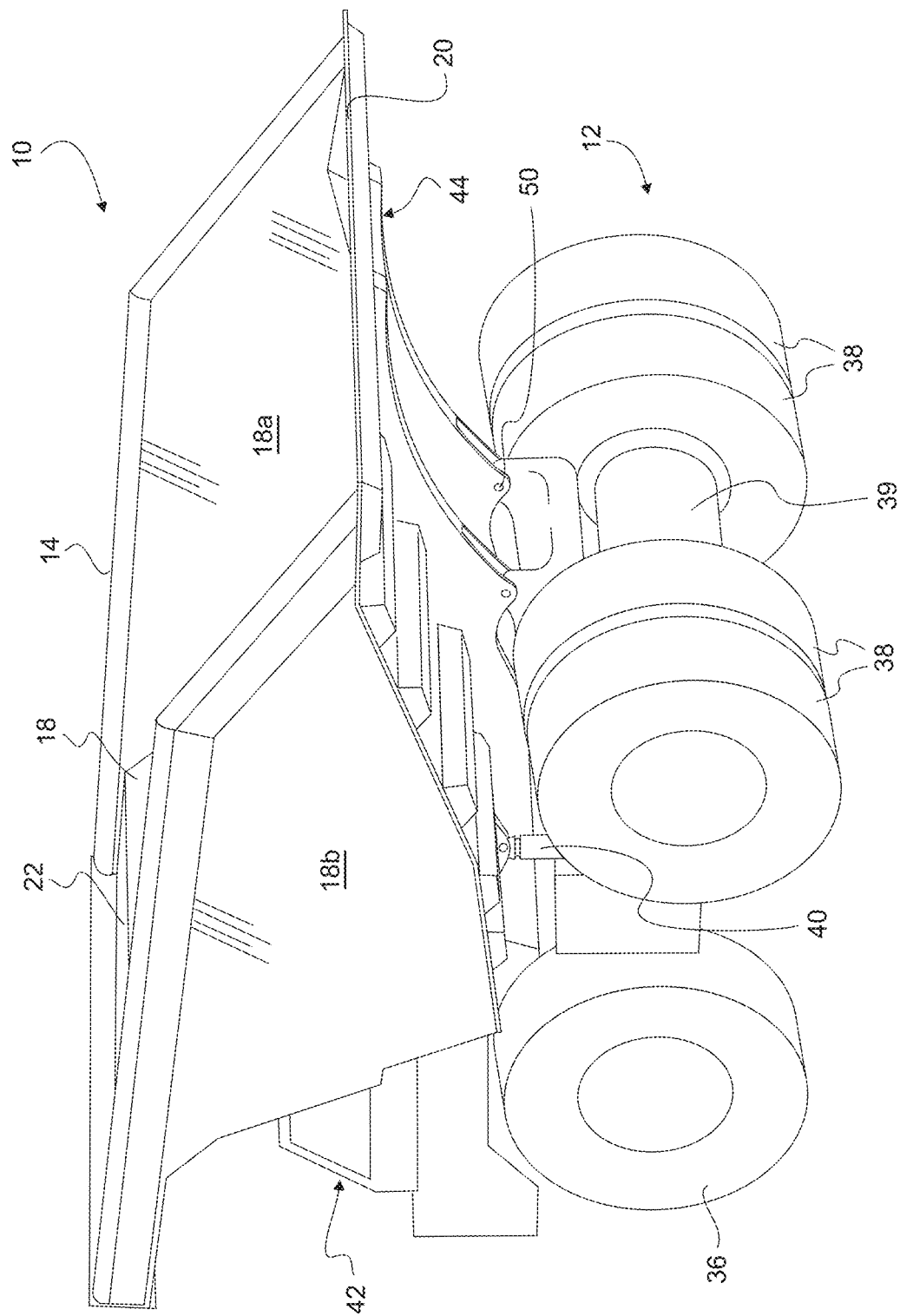
FIG. 6A depicts a lower rear perspective view of a 12/22/8 truck body mounted on a truck chassis.
Figure 6B:
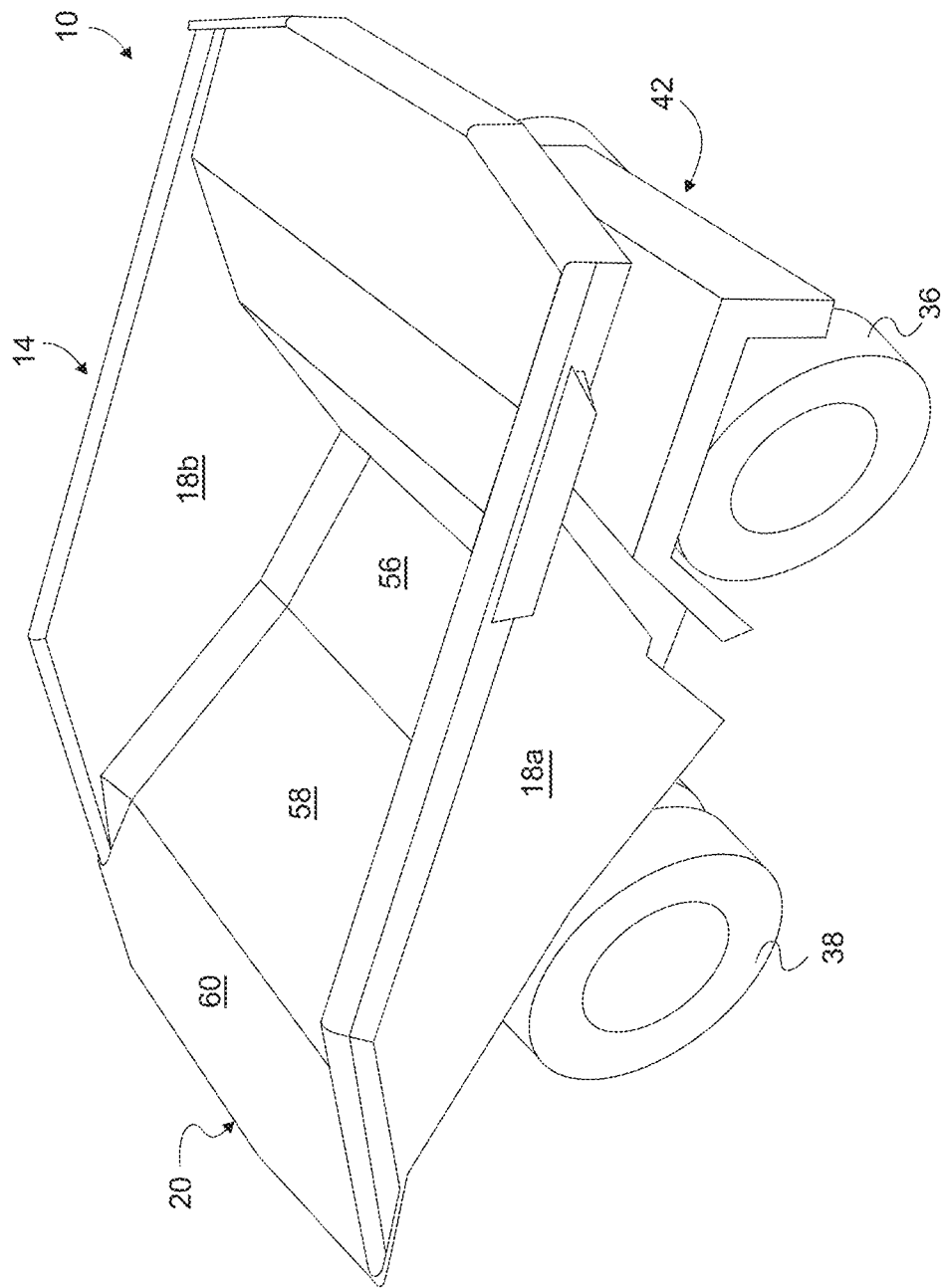
FIG. 6B depicts an upper front perspective view of a 12/22/8 truck body mounted on a truck chassis.
Figure 6C:
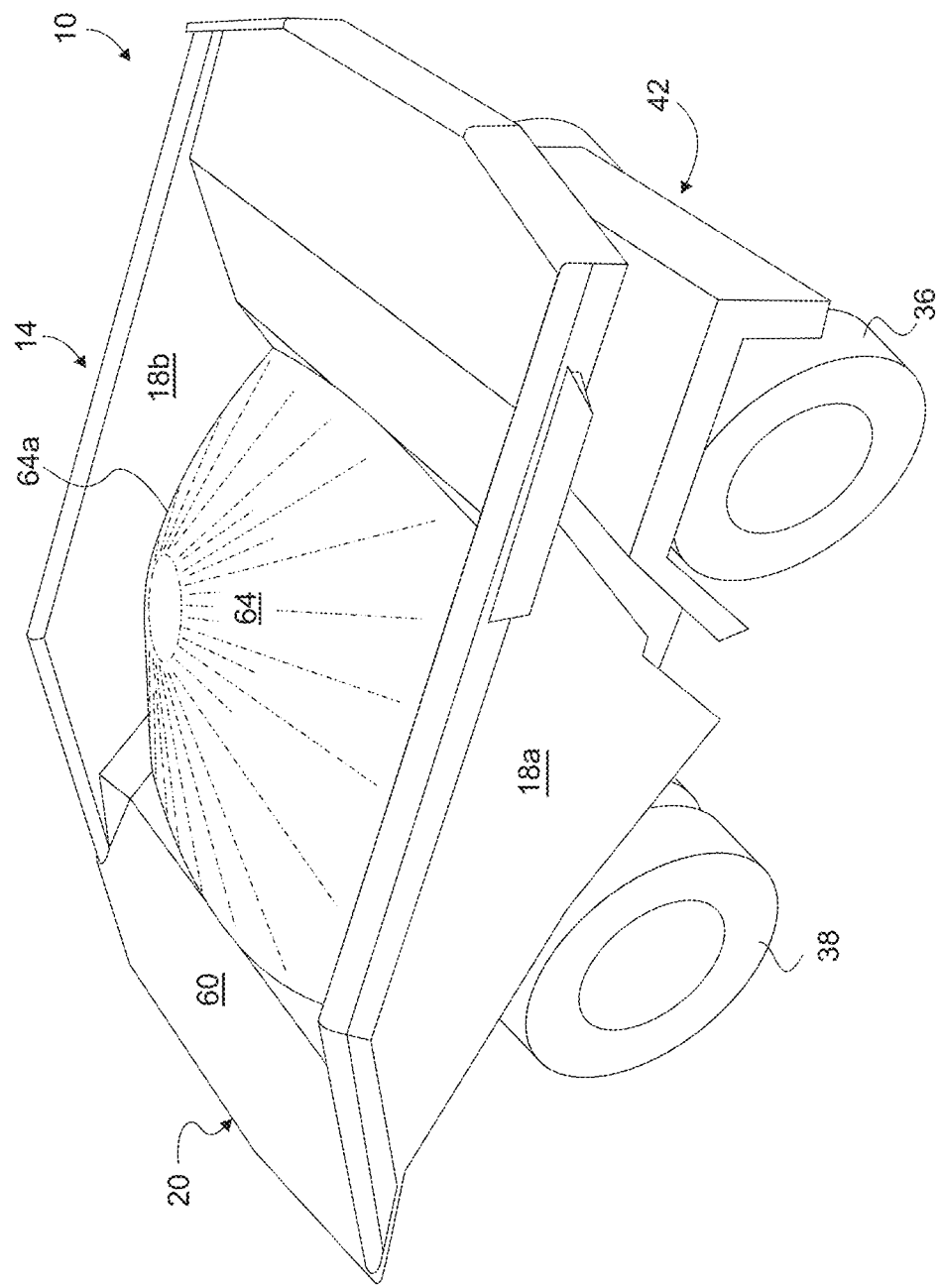
FIG. 6C depicts an upper front perspective view of a 12/22/8 truck body mounted on a truck chassis with a high density load shown in the body.

FIGS. 6A, 6B and 6C further depict the truck 10 having a body 14 according to the present disclosure. The body includes a front wall 16, two laterally (transversely) opposed side walls 18a and 18b, and a floor 20. However, in the embodiment depicted in FIG. 6B and FIG. 7, the floor 20 has three transverse sections, a front section 56 that is inclined to the horizontal at approximately 12 degrees, an intermediate section 58 that is inclined to the horizontal at approximately 22 degrees, and a tail panel 60 that is inclined to the horizontal at approximately 8 degrees. Thus, this floor 20 may be referred to as a 12/22/8 floor.

Figure 7:
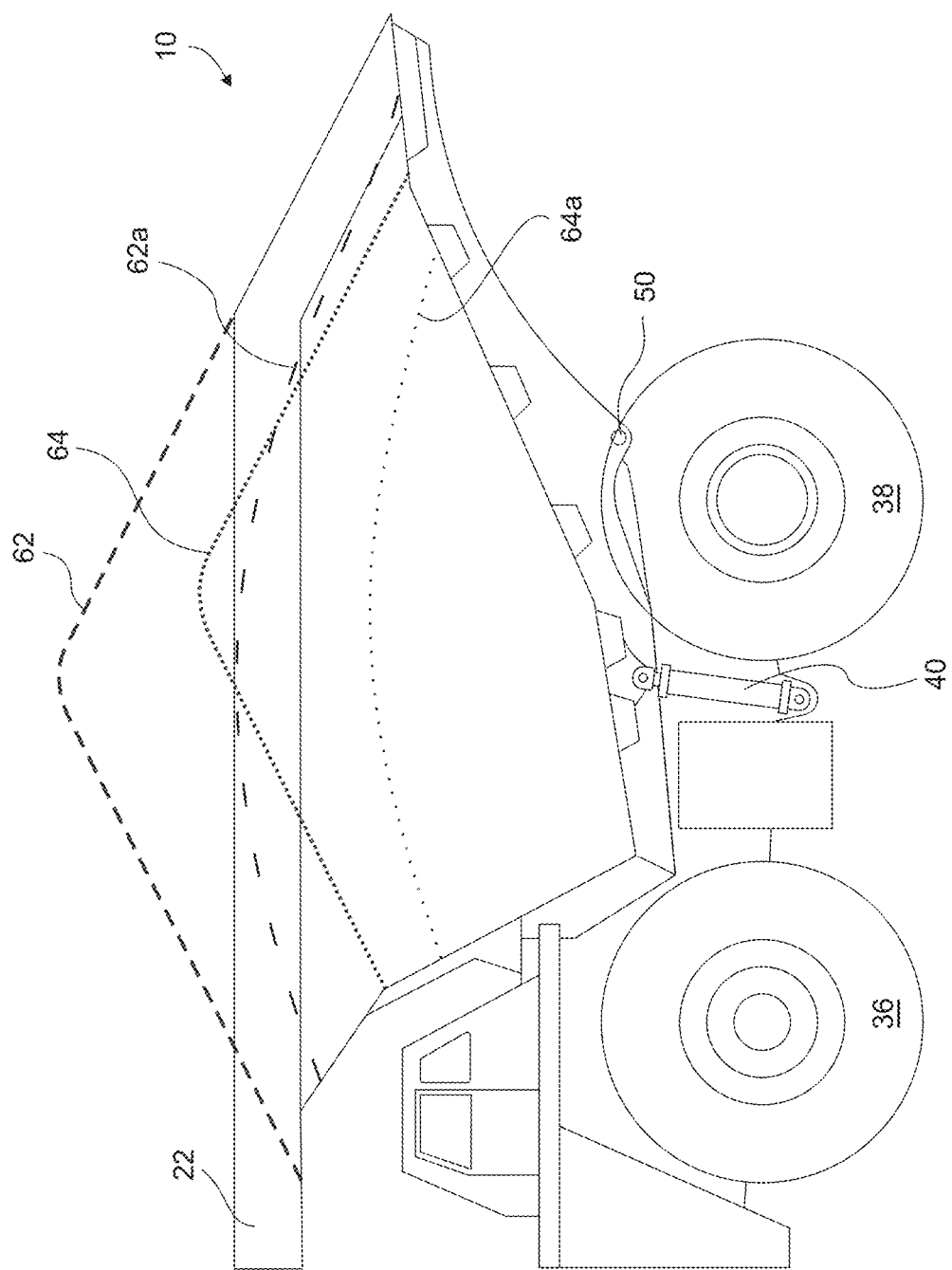
FIG. 7 depicts a side view of a truck body having a 12/22/8 floor and showing typical load cones for low density and high density material in the body in cross-section.

FIG. 7 depicts a truck 10 having a body 14 with the top of a coal load in dashed lines 62 and shows the abutment of the coal load with the side walls 18 in dashed lines 62a and with the top of an overburden load in dotted lines 64 and the abutment of the overburden load in dotted lines 64a. Because coal is of lower density than overburden, in all of the bodies shown in FIGS. 2, 3 and 7, a greater volume of coal may be placed into the cavity than overburden, as can be understood by comparing the load lines of the two materials. However, a comparison of the relative volumes of the loads shown in FIGS. 2 and 3 and that shown in FIG. 7 indicates that all the bodies have similar potential load volumes.

As a result of the generally conical shape of the load, and as depicted for example in FIG. 7, the height 62 of a coal load is higher than the side level 62a of the coal load. The same is true of the upper level 64 of an overburden load, which ends up higher above the floor 20 of the body 14 than the side level 64a of the overburden load. Furthermore, as depicted in FIGS. 2, 3 and 7, the height 26 or 62 of a coal load may be several feet higher than the height 28 or 64 of an overburden level, because depositing overburden to the level of coal would exceed the maximum tonnage rating of the truck 10.

Figure 1B:
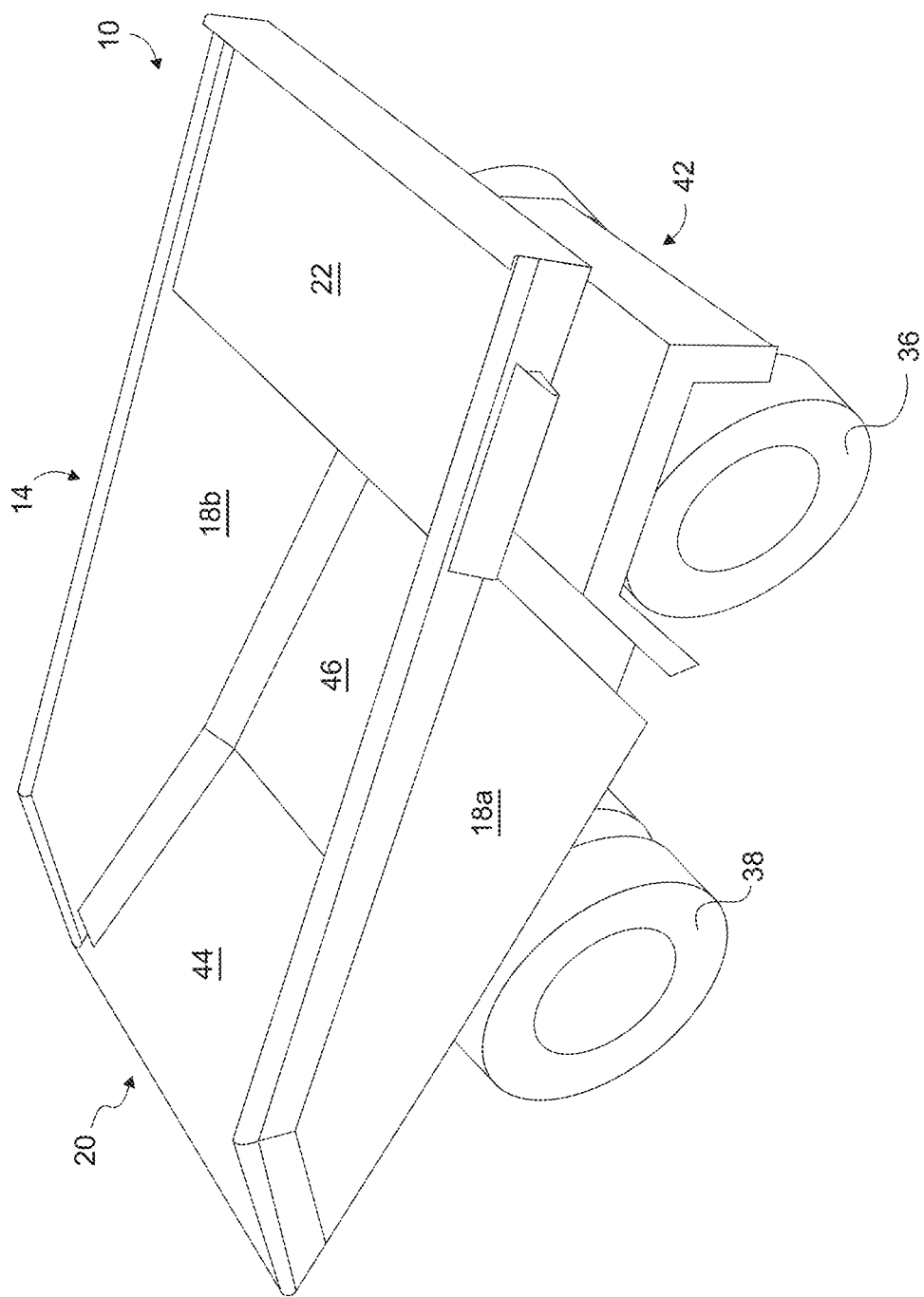
FIG. 1B depicts an upper front perspective view of a 12/22 truck body mounted on a truck chassis.

As depicted in FIGS. 1B, 2 and 3, in prior truck bodies, the floor 20 of the truck body 14 often had two panels, a forward panel 46 set at one angle from the horizon, and a rearward panel 44 set at an increased angle to the horizon. As previously discussed, this design may lead to the center of gravity of the load shifting aft during dumping. This shift is schematically depicted in FIGS. 8, 9, 10, and 11.

Figure 8:
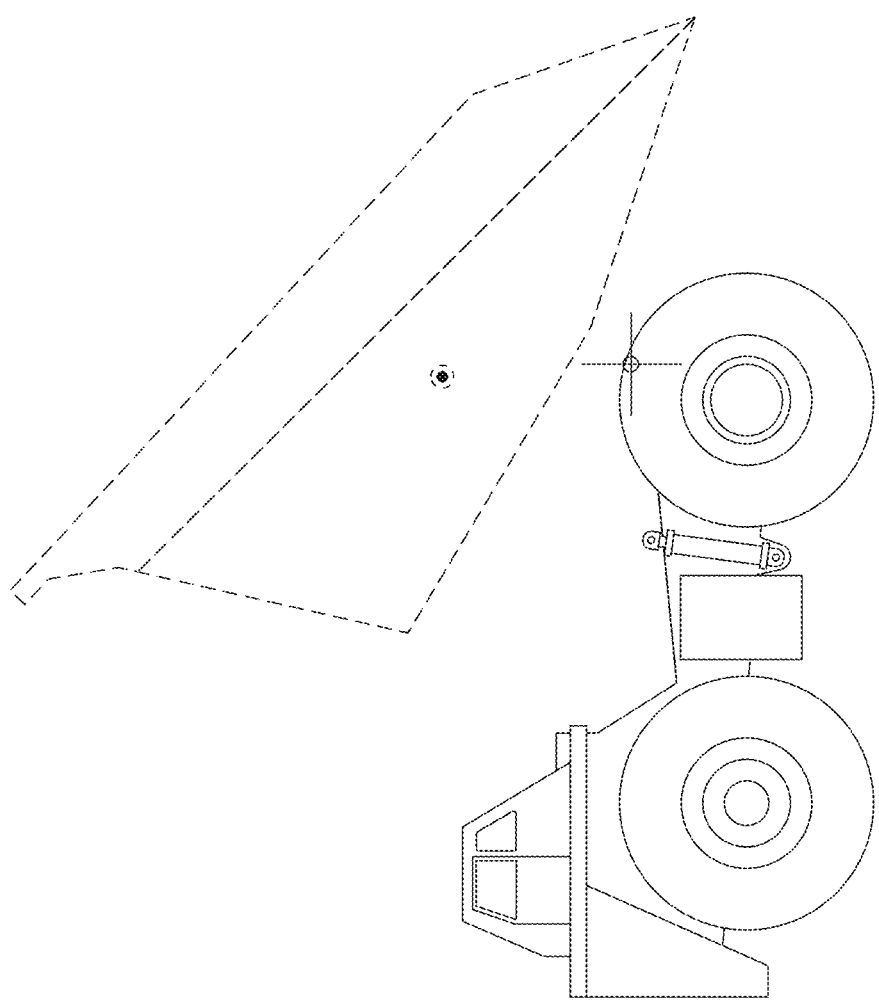
FIG. 8 depicts a schematic side view of a 12/22 body dumping coal, with the center of gravity of the load indicated by a dot encircled by a dashed circle.
Figure 9:
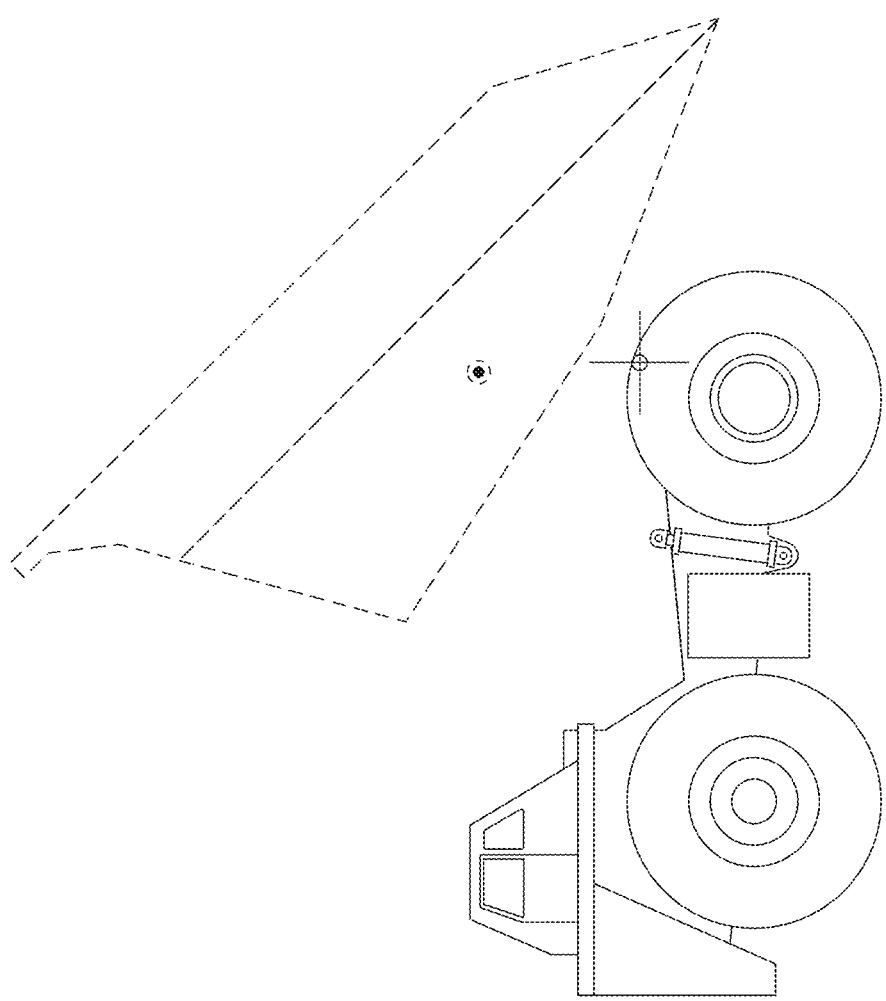
FIG. 9 depicts a schematic side view of a 12/22 body dumping overburden, with the center of gravity of the load indicated by a dot encircled by a dashed circle.
Figure 10:
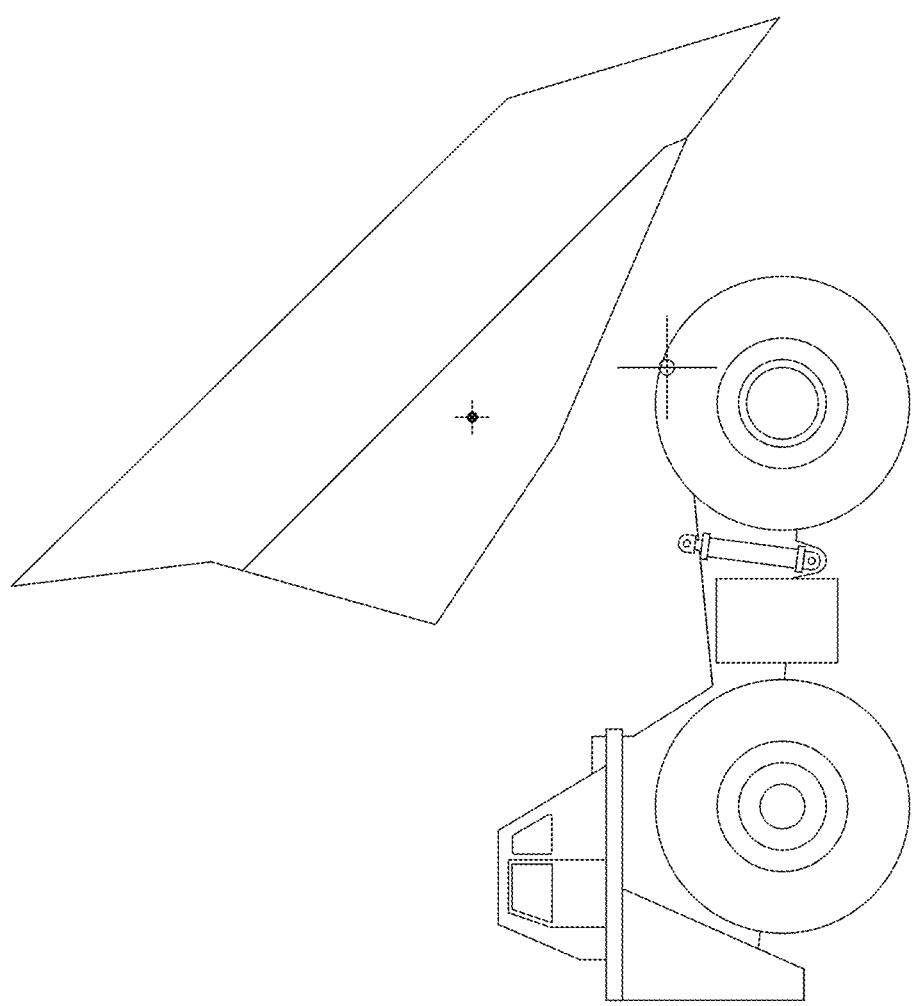
FIG. 10 depicts a schematic side view of a 12/22/8 body dumping coal, with the center of gravity of the load indicated by a "+"
Figure 11:
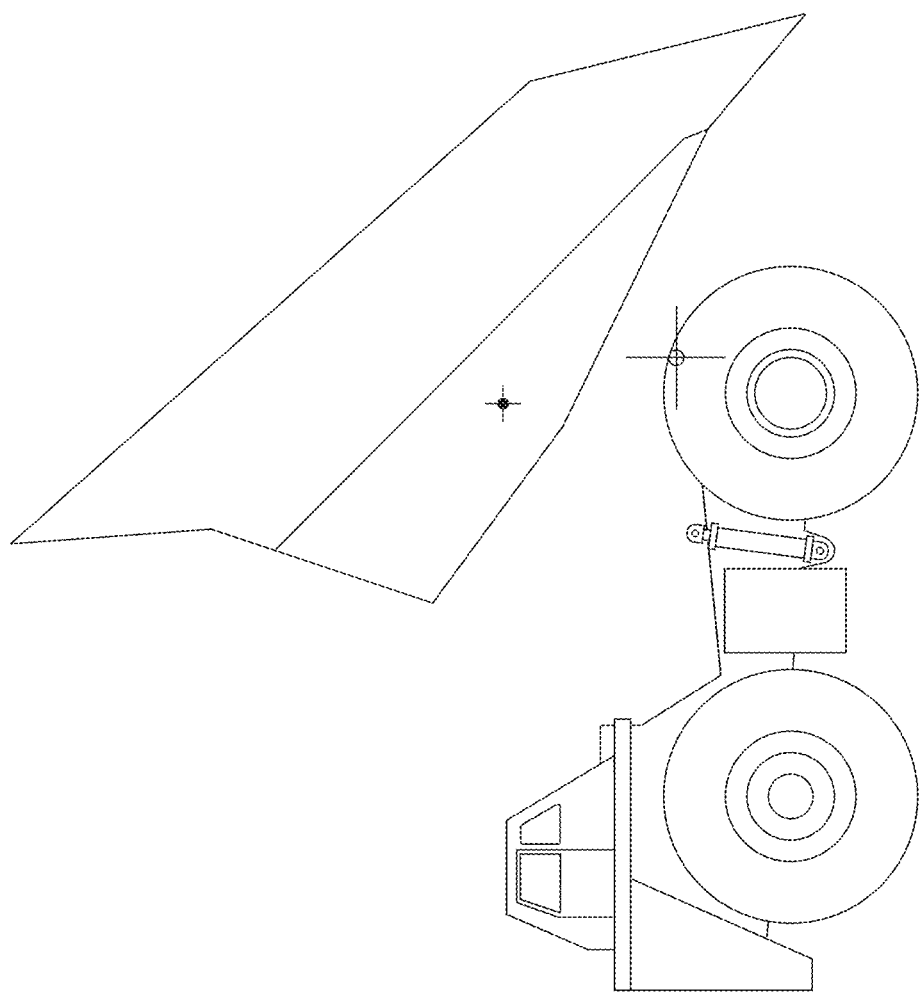
FIG. 11 depicts a schematic side view of a 12/22/8 body dumping overburden, with the center of gravity of the load indicated by a "+"

FIG. 8 depicts a 12/22 "dual slope" body dumping coal at approximately 45 degrees of rotation. FIG. 9 depicts a 12/22 "dual slope" body dumping overburden at approximately 45 degrees of rotation. FIG. 10 depicts a 12/22/8 body dumping coal at approximately 45 degrees of rotation, and FIG. 11 depicts a 12/22/8 body dumping overburden at approximately 45 degrees of rotation. In each case, the respective figure shows approximately where the center of mass of the respective load will be in the respective body; a dot enclosed by a dashed circle is used in FIGS. 8 and 9 for the center of mass of the load for the 12/22 body, and a "+" symbol superimposed on a dot is used in FIGS. 10 and 11 for the center of mass of the load for the 12/22/8 body.

Figure 12:
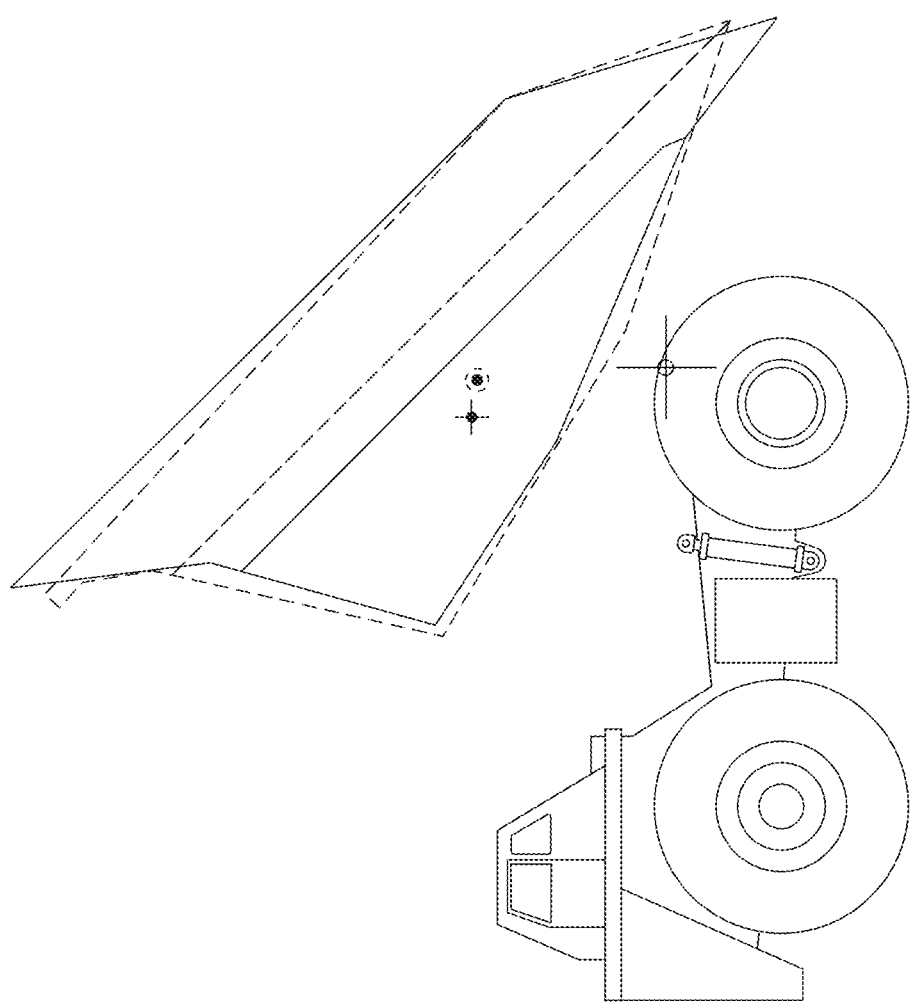
FIG. 12 depicts a schematic side view comparing a 12/22 body dumping coal and a 12/22/8 body dumping coal, with the respective centers of gravity of the loads indicated by a dot encircled by a dashed circle (12/22) and a "+" symbol (12/22/8)
Figure 13:
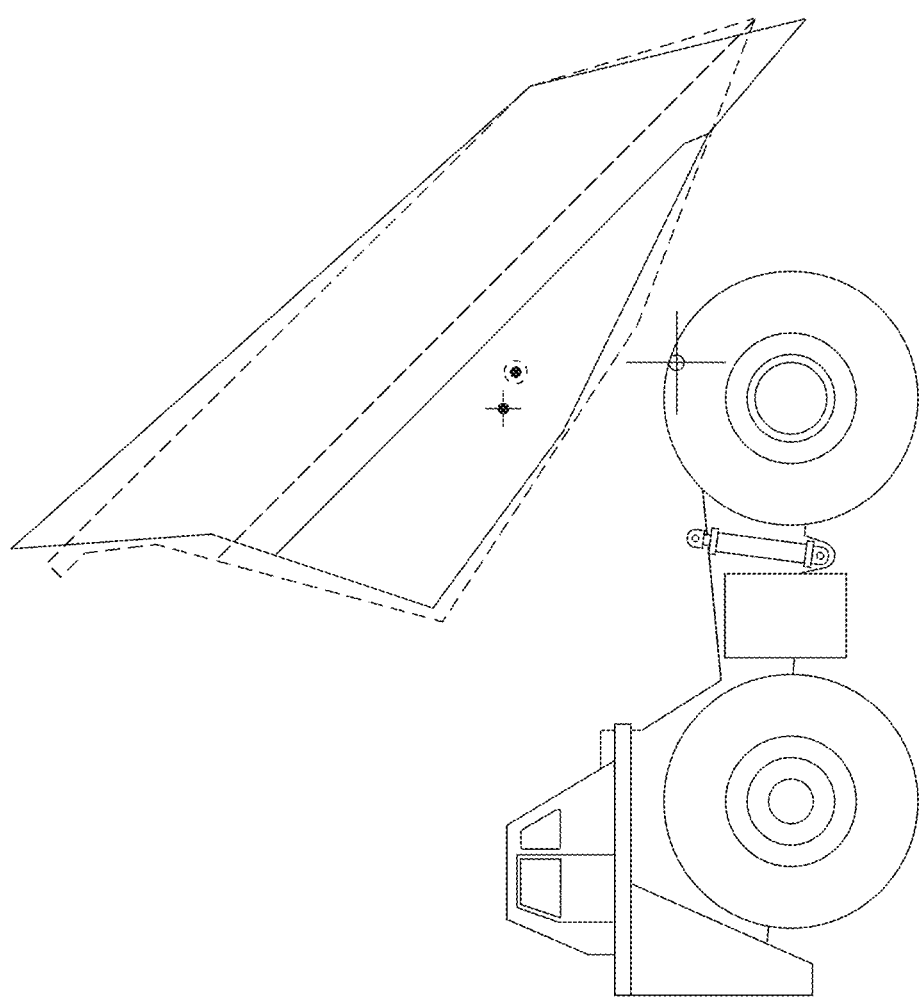
FIG. 13 depicts a schematic side view comparing a 12/22 body dumping coal and a 12/22/8 body dumping overburden, with the respective centers of gravity of the loads indicated by a dot encircled by a dashed circle (12/22) and a "+" symbol (12/22/8)

FIG. 12 depicts an overlay of FIGS. 8 and 10, and FIG. 13 depicts an overlay of FIGS. 9 and 11, showing a comparison of the locations of the centers of mass for the loads in the different bodies. As indicated in these figures, during dumping, the centers of mass of the loads shift towards the rear, but the center of mass of the load in a 12/22 "dual slope" body shifts further rearward than is the case with the 12/22/8 body. As discussed, this rearward shift in the center of gravity can lead to elevation of the truck cab 42 and tension on the lift cylinders 40.

As depicted in FIGS. 6B and 7, according to one embodiment, the body 14 has a floor 20 with three transverse sections, a forward panel 56 set at a first angle to the horizon, a further inclined intermediate panel 58, and a tail panel 60 set at a reduced (from the intermediate panel) angle to the horizon (all angles are defined as when the truck body is in a down or transportation attitude). The tail panel 60 permits supporting a low density load having a volume similar to that of prior bodies, because a low density load may extend unto the tail panel, see FIG. 7. However, when dumping the load, as depicted in FIGS. 12 and 13, the center of gravity of the load does not move rearward to the same extent as in prior bodies. Thus, the center of gravity remains forward of the pivot pins 50, meaning that the load will not tip the cab 42 nor will it suddenly cause the lift cylinders 40 to go into tension when dumping the load.

Analysis of this floor design indicates that the load will maintain a better weight distribution between the front tires 36 and back tires 38. This appears to be particularly true at increased angles of rotation of the body when dumping. Furthermore, current available analysis indicates that the load will actually shed at an improved rate, and at a lower angle of rotation of the body, than is the case with prior bodies.

When rotating the body depicted in FIG. 7, the tail panel 60 of the floor 20 subtracts from the potential payload behind the pivot pins 50 as compared to the prior 12/22 and 12/17 dual slope floors. As a result, when the body 14 is rotated, the portions of the floor 20 behind the pivot pins 50 may be at an angle of 8 degrees from the horizontal as opposed to a 22 degree angle for a 12/22 body. Because of this reduced angle, any material falling to the tail panel of the body is quickly shed rather than forming a secondary heap. The two floor panels 56 and 58 in front of the tail panel 60 and each will shed in sequence, rear to forward, as the body is rotated.

Figure 14:
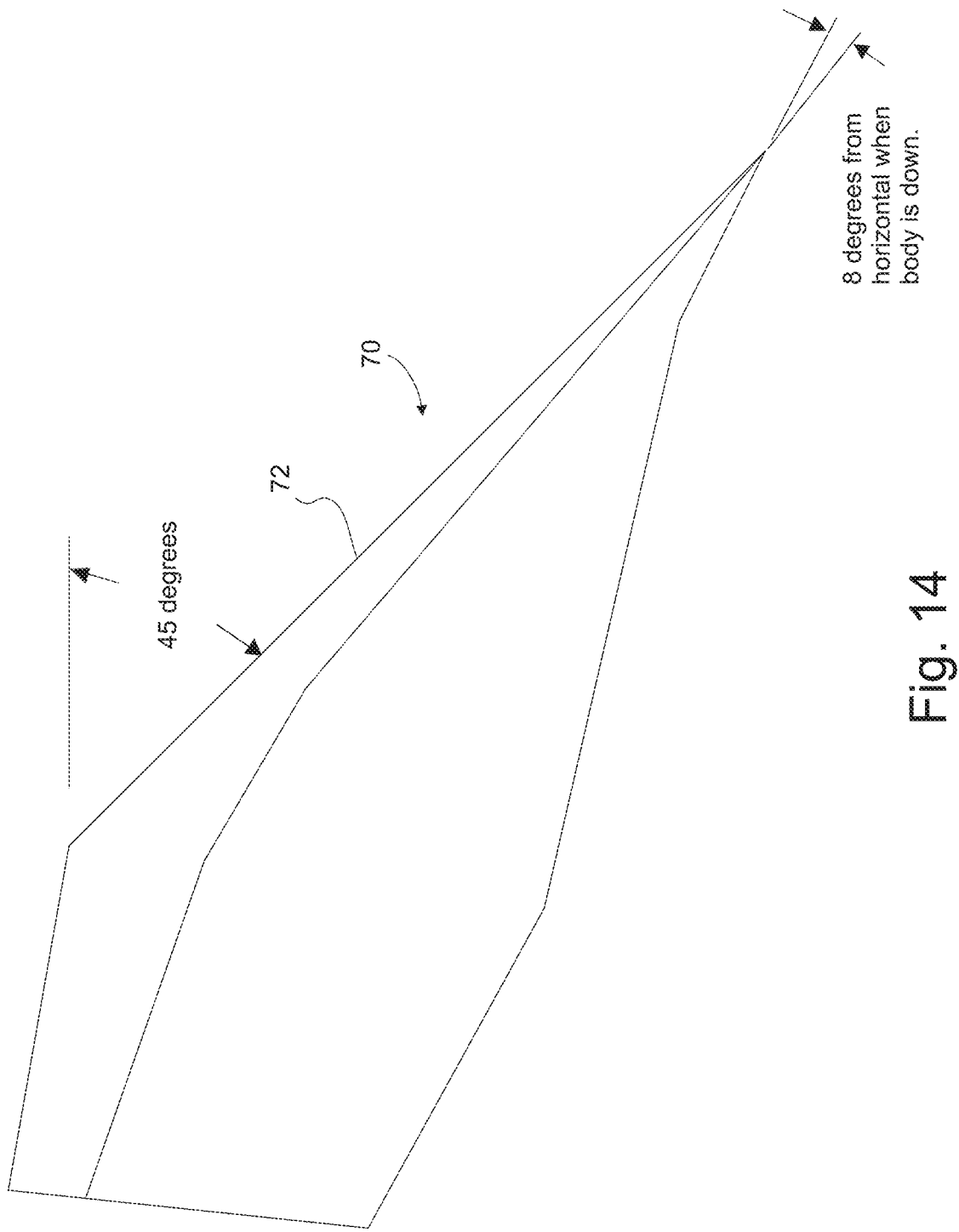
FIG. 14 depicts a first schematic representation of a load shedding from a 12/22/8 body at approximately 36 degrees rotation.

FIG. 14 depicts a sample payload 70 in a body 14 rotated 36 degrees. As the body has rotated, the tail panel 60 of the body has filled with depositing material and a small portion of the load or overburden has shed along the heap line 72. It is apparent that this configuration minimizes tail loading and the potential for impact loading by a "landslide" event as has been witnessed on other body designs.

Figure 15:
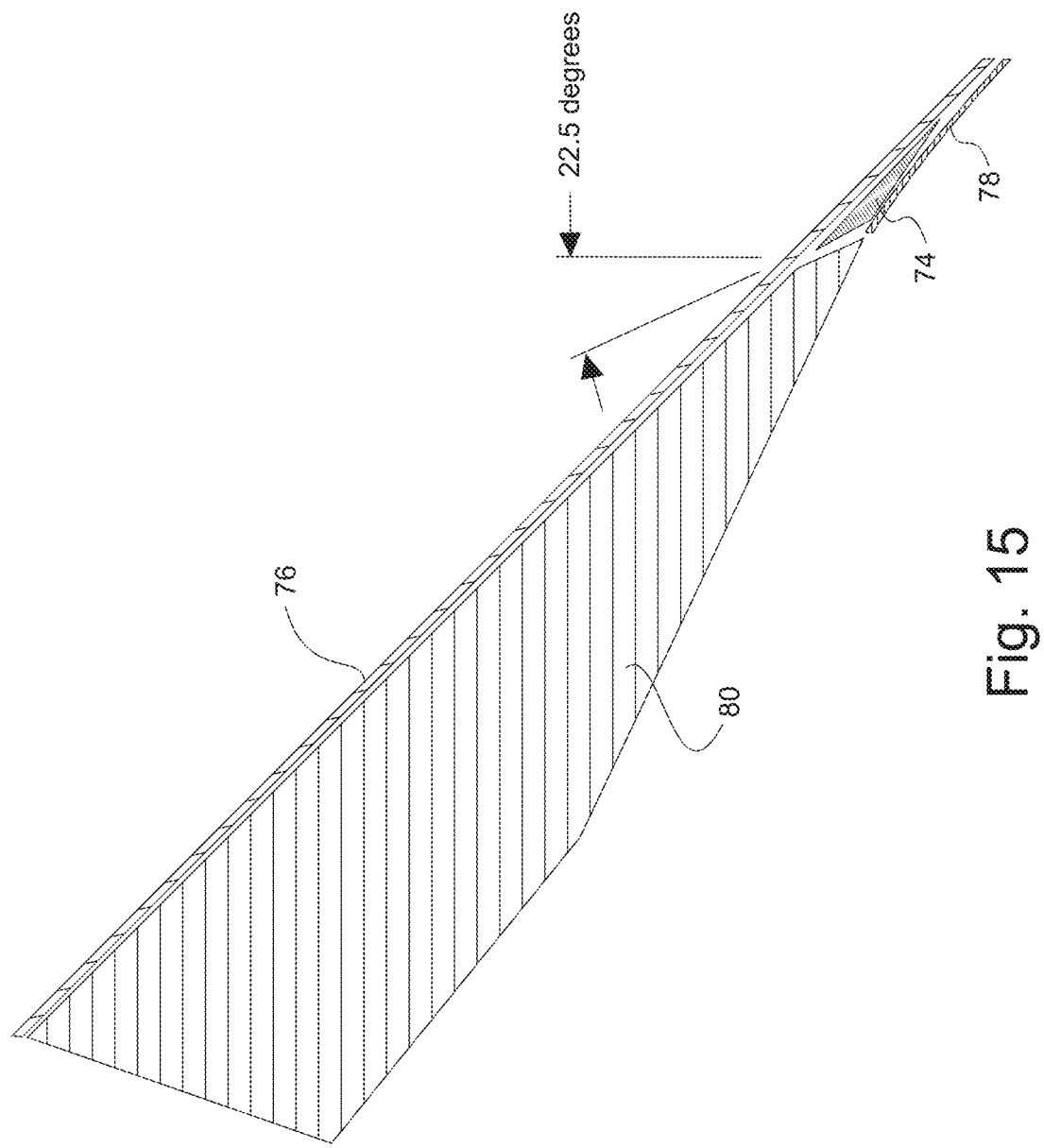
FIG. 15 depicts a second schematic representation of a load shedding from a 12/22/8 body at approximately 36 degrees rotation.

Referring to FIG. 15, when the tail section 74 of the payload has rotated to an angle at which it will slide under the influence of gravity, the payload immediately forward of the shear line between section 74 and the remaining mass 80 will shear. In this example, the shear line is angled approximately 67.5 degrees, as shown in FIG. 15, off horizontal (hence 22.5 degrees off vertical) and the mass that is sheared applies minimal loading to the tail panel 60. Layers sliding above this point along the heap shear line 76 assist in the shearing action, but as the shearing section begins sliding, the tail panel 60, which is rotating along with the rest of the body 14, rotates down and away from the accelerating flow above.

The overall length of the floor 20 is effectively getting shorter as the body 14 is dumping and the necessary accelerated flow is maintained. The available volume of payload along the heap shear line 76 increases, thereby alleviating significant damming problems (that is, the potential for a portion of the payload to drop unto the rear end of the floor and create a dam or secondary heap that could then resist the flow of payload out of the body). The momentum of the flow above imparts a small amount of apparent lift as a result of these events occurring at the same time. As the body 14 continues to rotate, the shear line moves ahead to the next panel (or level) and the process repeats itself (or, perhaps more accurately, continues).

FIG. 15 demonstrates the process described with visible separations between the shedding mass 76, the shearing section 74 adjacent to the tail panel 60, and the mass 78 above the tail panel 60. The remaining mass 80 is still being supported by the chassis 12, and this material may be input into analysis programs for mathematical analysis of the process, as described in more detail below. In other words, this constant sheering of the upper level of the load tends to create a continuous shedding of the load, meaning that there typically is no sudden shift of a large portion of the load in a minimal amount of time.

FIG. 16 depicts an overburden load in a prior, dual slope 12/22 body 14 on the left and an overburden load in a 12/22/8 body according to one embodiment of the present disclosure on the right. The respective loads are shown at various angles of rotation when dumping the load. FIG. 17 is a spreadsheet showing a mathematical analysis of the state of the load in the two bodies (the 12/22 and the 12/22/8) at the various angles depicted, and on a 240 ton capacity truck.

The analysis described includes comparison of the initial sizes of the loads, the volumes and weights of the loads dispensed from the two bodies at the various angles, and the proportion of the load dispensed at those angles. The approximate locations of the centers of gravity of the respective loads are also set forth in FIG. 16 at the various angles given. Although this example involves bodies on a 240 ton capacity truck, the general principles would typically apply to other trucks, though the preferred angles of the various sections of the body floor would likely need to be adjusted for different truck chassis.

The analysis of the bodies 14 and their loads depicted in FIG. 16 and described herein involves certain general principles and premises. Typically, the coefficients of friction of the load material against itself and against the sides 18a and 18b and floor 20 of the body are such that the material slides along itself and falls out of the body when the heap line 86 of the load is at an angle of about 45 degrees from the horizontal, see FIGS. 14 and 15. The chart in FIG. 17 thus is a set of mathematical calculations for discharge of a payload at various angles of elevation of each style of body (12/22 and 12/22/8) when dumping. In each case, the angle of rotation is that of the body from a fully lowered, transport position.

The data in FIG. 17 was calculated for the discharge of material from the two different bodies 14 mounted on a 240 ton capacity truck. Rows 2 through 12 of FIG. 17 contain information about a typical prior dual slope "12/22" gate-free body 14. Rows 14 through 24 contain information relating to a body made in accordance with one embodiment of the present design, a gate-free body with a short tail panel 60 having an angle of 8 degrees from the horizontal (that is, a "12/22/8" body)

The examples set forth in FIG. 17 show the discharge properties for two different bodies on a 240 ton capacity truck and model mathematical calculations using dirt (overburden) as the payload and assuming a constant 45 degree discharge of the material sliding upon itself (that is, the material will slide when the upper shedding surface of the material is at a 45 degree angle to the horizontal). Using a prior 12/22 body (meaning the forward panel of the floor is offset 12 degrees from horizontal, and the rearward part of the floor is offset an additional 10 degrees for a total of 22 degrees from the horizontal), and assuming an initial load of 510,022 pounds (see column F of FIG. 17) having a volume of approximately 193.2 cubic yards (column E) and a truck and body tare weight of approximately 336,000 pounds, the modeled body is raised at a constant speed by the lift cylinders 40 to different degrees of rotation up to a rotation of 54 degrees (see row 12 of FIG. 17).

As may be seen from the chart (FIG. 17), in this pair of examples the initial payload is about 510,000 pounds, and approximately 193.2 cubic yards of material. The material is overburden which, as discussed above, is about twice as dense as a load of coal. As indicated in the chart, see line 4 of FIG. 17, the 12/22 truck body 14 begins to dump its load at about 36-38 degrees of rotation (that is, rotation of the body 36-38 degrees about the of the pivot pins 50).

As shown in FIG. 17, at 38 degrees of body rotation, calculated payload remaining in the prior 12/22 body 14 is 192.9 cubic yards and 509,230 pounds from the initial load of 193.2 cubic yards and 510,022 pounds. At that point, the load distribution, including the tare weight of the truck and body, may be calculated from the load geometry. Thus, at 38 degrees, the load on the front axle is approximately 114,261 pounds and the load on the rear axle is approximately 730,968 pounds, and approximately 792 pounds of the payload has fallen out of the body. This means that at 38 degrees body rotation, the front axle load is approximately 13.5 percent, and the rear axle load is 86.5 percent of the remaining load (99.8 percent of the load remains in the body). Furthermore, the load on the lift cylinders at 38 degrees remains at −85,825 pounds, that is, 85,825 pounds in compression.

Considering other angles noted in the chart (FIG. 17), at 42 degrees of body rotation (that is, rotation of the body 42 degrees about the axis of the pivot pins 50), calculated payload remaining in the prior 12/22 body 14 is 179.3 cubic yards and 473,246 pounds. At 42 degrees, the load on the front axle is approximately 100,316 pounds and the load on the rear axle is approximately 708,930 pounds, and approximately 36,775 pounds of the payload has fallen out of the body. This means that at 42 degrees body rotation, the front axle load is 12.4 percent, and the rear axle load is 87.6 percent of the remaining load, with 92.8 percent of the load remaining in the body. Furthermore, the load on the lift cylinders at 42 degrees is −44,510 pounds, that is, 44,510 pounds in compression.

As further indicated in FIG. 17, at 46 degrees body rotation, the calculated payload remaining in the prior 12/22 body 14 is 148.4 cubic yards and 391,829 pounds. At 46 degrees, the load on the front axle is approximately 99,807 pounds and the load on the rear axle is approximately 628,022 pounds, and approximately 118,193 pounds of the payload has fallen out of the body. At 46 degrees, the front axle load is 13.7 percent, and the rear axle load is 86.3 percent of the remaining load, with 76.8 percent of the load remaining in the body. Furthermore, the load on the lift cylinders at 46 degrees is −23,775 pounds, that is, 23,775 pounds in compression.

At 50 degrees body rotation, the calculated payload remaining in the prior 12/22 body 14 is 114.5 cubic yards and 302,386 pounds. At 50 degrees, the load on the front axle is approximately 91,545 pounds and the load on the rear axle is approximately 546,841 pounds, and approximately 207,636 pounds of the payload has fallen out of the body. At 50 degrees, the front axle load is 14.3 percent, and the rear axle load is 85.7 percent of the remaining load, with 59.3 percent of the load remaining in the body. However, as indicated in FIG. 17, at 50 degrees body rotation, the load on the lift cylinders has become positive, in this example 20,127 pounds, that is, 20,127 pounds in tension. As a result, between 48 and 50 degrees of body rotation, the center of gravity of the load has shifted so far to the rear that the lift cylinders 40 have gone into tension, and there is a significant risk the body will suddenly rotate upwardly, accelerating the entire truck cab 42 into the air, dumping the remaining load, and dropping the truck cab back to the ground in a brief period of time. As further noted in FIG. 17, as this increased rotation occurs, even with four additional degrees of rotation (to 54 degrees of body rotation), there remains nearly 40% of the initial load in the body.

FIG. 17 also shows calculations for a 12/22/8 body 14 manufactured in accordance with one embodiment of the present design, again mounted on a 240 ton capacity truck and using dirt (overburden) as the payload, but with an initial payload of 509,916 pounds. The payload is calculated based on the geometry of the body. Although the 12/22/8 body indicates a payload slightly less than the prior 12/22 body, in practice the mining load bucket is not exact and a one hundred six pound (0.02%) load delta is inconsequential.

As set forth in FIG. 17, see line 16, at 38 degrees rotation of the 12/22/8 body, calculated payload remaining in the 12/22/8 body 14 is 182.5 yards and 481,826 pounds. Again, at that point, the load distribution may be calculated from the load geometry. Thus, at 38 degrees, the load on the front axle is 123,339 pounds and the load on the rear axle is 694,488 pounds, and at this early point in the dump cycle approximately 28,090 pounds of payload has fallen out of the body. This means that at 38 degrees, the front axle load is 15.1 percent, and the rear axle load is 84.9 percent, and 94.5 percent of the load remains in the body (five percent less than in the 12/22 body at the same rotation). Furthermore, the load on the lift cylinders 40 at 38 degrees is at 101,072 pounds in compression. As mentioned above, a compressive load on the lift cylinders is important, because the lift cylinders are primarily designed for compression (pushing) forces, but can be damaged if subjected to tensile (pulling) forces.

As set forth in FIG. 17, see line 18, at 42 degrees rotation of the 12/22/8 body, calculated payload remaining in the 12/22/8 body 14 is 157.2 yards and 414,876 pounds. At that point, the load on the front axle is 124,212 pounds and the load on the rear axle is 626,664 pounds, and approximately 95,040 pounds of payload has fallen out of the body. This means that at 42 degrees, the front axle load is 16.5 percent, and the rear axle load is 83.5 percent, and 81.3 percent of the load remains in the body. Furthermore, the load on the lift cylinders at 42 degrees is at 88,897 pounds in compression.

As further indicated in FIG. 17, see line 20, at 46 degrees body rotation, calculated payload remaining in the 12/22/8 body 14 is 122.7 yards and 323,981 pounds. At that point, the load on the front axle is 124,106 pounds and the load on the rear axle is 535,875 pounds, and approximately 185,935 pounds of payload has fallen out of the body. Notice that between 42 and 46 degrees of rotation, nearly the entire decrease in payload has deducted from the rear axle (the rear axle has lost about 90,789 pounds while the front axle has lost a mere 343). This means that at 46 degrees, the front axle load is 18.8 percent, and the rear axle load is 81.2 percent, and 63.5 percent of the load remains in the body. Furthermore, the load on the lift cylinders at 46 degrees is at −67,868 pounds, meaning 67,868 pounds in compression.

At 50 degrees body rotation, see line 22, calculated payload remaining in the 12/22/8 body 14 is 86.4 yards and 228,175 pounds. At that point, the load on the front axle is 124,780 pounds (a small increase over 46 degrees) and the load on the rear axle is 439,396 pounds, and approximately 281,741 pounds of payload has fallen out of the body. Notice that between 46 and 50 degrees of rotation, the entire reduction in the load has deducted from the rear axle. This means that at 50 degrees, the front axle load is 22.1 percent, and the rear axle load is 77.9 percent, and only 44.7 percent of the load remains in the body. Furthermore, the load on the lift cylinders at 50 degrees is −46,637 pounds, meaning 46,637 pounds in compression. In contrast with the prior 12/22 body, then, the 12/22/8 body remains significantly in compression even at 50 degrees of rotation.

Furthermore, as shown in FIG. 17, the 12/22/8 body continues to maintain a significantly greater forward center of gravity location of the load than the 12/22 body through all of the body rotations calculated. Indeed, as set forth in FIG. 17, the 12/22/8 body sheds payload primarily from the rear axle during the entire rotation from 36 degrees to 54 degrees. Notice that for the 12/22/8 body, that increased rotation (36 to 50 degrees) results in a front axle reduction of 6675 pounds with a concurrent a rear axle reduction of 354,265 pounds (hence over 98 percent of the reduction in payload comes from the rear axle), whereas for the same rotation the prior 12/22 body has a front axle reduction of 48,858 pounds and a rear axle reduction of 261,289 pounds (meaning less than 85 percent load reduction of the rear axle). Also, the total weight retained in the body at 54 degrees rotation is significantly less for the 12/22/8 body than for the 12/22 body. Most importantly, the 12/22/8 body does not put the lift cylinders into tension even at 54 degrees (when only 28.5 percent of the payload remains in the body), whereas the prior 12/22 body places the lift cylinders at tension before 50 degrees rotation, with nearly 60 percent of the load remaining in the body.

FIG. 16 depicts side views of overburden loads in the 12/22 body and in the 12/22/8 body at the same angles of body rotation as discussed above, that is, at 38 degrees, 42 degrees, 46 degrees, 50 degrees and 54 degrees. As depicted therein, a dot in a circle indicates the calculated approximate center of gravity of the payload at each angle of rotation for the 12/22 body, and a "+" indicates the calculated approximate center of gravity of the payload at each angle of rotation for the 12/22/8 body. In both sets of figures, a small dot below the depiction of the load indicates the approximate location of the fulcrum or pivot pins 50 for the indicated truck body rotation.

As can be seen, a truck with a 12/22 body has a payload center of gravity that will fall behind the pivot pins at some point after about 48 degrees of rotation, meaning that at that rotation, the truck risks tension on the lift cylinders and rotation of the entire truck about the rear wheels, possibly propelling the cab upward. As can be seen, and as was shown by the calculations discussed, the center of gravity of the payload of the 12/22/8 body does not shift behind the rear wheels even at 54 degrees rotation with just over 25% of the payload remaining in the body.

The mathematical calculations set forth herein were supported by a scale model demonstration. Two model bodies (a dual slope body and one with a three section floor as described) were loaded with different materials and mounted, side-by-side, to a pivot point. The loads were slowly rotated. Both began shedding material at about the same angle of body rotation, though the 12/22/8 model dumped at a higher rate (as predicted by the mathematical model).

At some point in the rotation, roughly determined by analysis of the video to be between about 48 degrees and about 52 degrees, the 12/22 dual slope body actually "jumped" in the rotation and dumped a significant proportion of the load, meaning the load had shifted so far to the rear that the body was no longer being supported by the lifting points, but rather suddenly rotated because the center of mass of the payload shifted behind the fulcrum or pivot pins of the body. Were this to happen in a real world application, the cab of the truck could suddenly be jolted several feet into the air. Furthermore, this sudden rotation could cause the load to suddenly drop and the cab would then drop back to earth. In any event, this demonstrates that the lift cylinders 40 would have almost immediately gone into tension, with the risk of damage to the lift cylinders, and once the load dropped, rapidly back into compression, again with a risk of damage.

Although the embodiments discussed in this disclosure involve a three-part floor, a floor having more sections would also work. Indeed, there is no reason that the body could not have a curved floor rather than the angled flooring depicted, to provide perhaps even more payload capacity. A two part floor would likely also provide many of the advantages of the three part floor embodiment disclosed. Furthermore, although described with respect to a combination body for large mining trucks, the present designs may also be useful for bodies used in other applications. Thus, the present invention has several advantages over the prior art. Although embodiments of the present invention have been described, various modifications and changes may be made by those skilled in the art without departing from the spirit and scope of the invention.

The invention claimed is:

1. A dump truck body for the transport of materials of different densities, the truck body configured to be mounted on a chassis of a truck having at least one front axle having a center point and at least one back axle having a center point, the center point of the at least one front axle and the center point of the at least one back axle thereby defining a reference line, the truck body having a longitudinal floor with a pair of laterally opposed spaced upwardly extending side walls coupled to the floor and a forward upwardly extending front wall coupled thereto between the side walls to create a volume for carrying a payload having a center of mass, the truck body further comprising at least one pivot point at which the truck body may be pivotally mountable to the truck chassis, the body further configured to connect to at least one lift cylinder mounted to the truck chassis and to the body, the lift cylinder being configured to lift and to pivot the body about the pivot point and thereby dispense a payload, the floor comprising:

a first forward panel coupled to the front wall and disposed to create a first predetermined angle as compared to the reference line when the truck body is in a lowered position for transport;

a second intermediate panel disposed to create a second predetermined angle as compared to the reference line when the truck body is in a lowered position for transport, the second predetermined angle being greater than the first predetermined angle; and a tail panel disposed to create a third predetermined angle as compared to the reference line, the third predetermined angle being less than the second predetermined angle.

2. The truck body of claim 1 wherein the third predetermined angle is such that when the truck body is rotated into a dumping position, the tail panel does not apply a significant rotational load torque on the truck body.

3. The truck body of claim 1 in which the tail panel forms a spillway for a payload so that the center of mass of the payload remains forward of the pivot point when the truck body is pivoted upward to dispense the payload.

4. A truck body having a longitudinal floor with a pair of laterally opposed upwardly extending laterally spaced side walls coupled to the floor and a forward upwardly extending front wall coupled thereto between the side walls to create a volume for carrying a payload having a center of mass, the truck body further comprising at least one pivot point at which the truck body may be pivotally mountable to a truck chassis, the body further configured to connect to at least one lift cylinder mounted to the truck chassis and to the body, the lift cylinder being configured to lift and to pivot the body about the pivot point and thereby dispense a payload, the truck chassis having at least one front axle having a center point and at least one back axle having a center point, the center point of the at least one front axle and the center point of the at least one back axle thereby defining a reference line, the floor comprising:

a first forward panel coupled to the front wall and disposed to create a first predetermined angle of between 5 and 26 degrees as compared to the reference line when the truck body is in a lowered position for transport;

a second intermediate panel disposed to create a second predetermined angle as compared to the reference line when the truck body is in a lowered orientation; and a tail panel disposed to create a third predetermined angle as compared to the reference line when the truck body is in a lowered orientation.

5. The truck body of claim 4 wherein the third predetermined angle is such that when the truck body is rotated into a dumping position, the tail panel does not apply a significant rotational load torque on the truck body.

6. The truck body of claim 4 in which the second predetermined angle is between 6 and 26 degrees.

7. The truck body of claim 4 in which the third predetermined angle is between 0 and 15 degrees.

8. The truck body of claim 4 in which the tail panel forms a spillway for a payload so that the center of mass of the payload remains forward of the pivot point when the truck body is pivoted upward to dispense the payload.

* * * * *